United States Patent [19]

Kawai et al.

[11] Patent Number: 4,876,649
[45] Date of Patent: Oct. 24, 1989

[54] HARM PREVENTING APPARATUS FOR VEHICLE

[75] Inventors: Taneichi Kawai, Anjo; Tomio Yasuda, Kasukabe; Koji Aoki, Kawasaki, all of Japan

[73] Assignee: Aisin Seiki Kabushikikaisha, Aichi, Japan

[21] Appl. No.: 46,006

[22] Filed: May 4, 1987

[30] Foreign Application Priority Data

May 6, 1986 [JP] Japan .................................. 61-103688
May 6, 1986 [JP] Japan .................................. 61-103689
Aug. 19, 1986 [JP] Japan .................................. 61-193835

[51] Int. Cl.$^4$ ............................................. B60R 25/00
[52] U.S. Cl. ................................ 364/424.05; 340/426; 307/10.2
[58] Field of Search ................... 364/424.05, 425, 550; 340/63–65, 517, 523, 541, 542, 545, 562, 426; 180/173, 272–274, 277, 287; 307/10 AT, 10.2–10.5

[56] References Cited

U.S. PATENT DOCUMENTS

| | | | |
|---|---|---|---|
| 3,858,175 | 12/1974 | Kopera, Jr. ..................... | 307/10 AT |
| 4,240,516 | 12/1980 | Henderson et al. ................ | 340/63 |
| 4,383,242 | 5/1983 | Sassover et al. ............... | 307/10 AT |
| 4,574,268 | 3/1986 | Ohnishi ......................... | 307/10 AT |
| 4,638,294 | 1/1987 | Sakurai ............................. | 180/287 |
| 4,683,373 | 7/1987 | Tupman ............................. | 180/272 |
| 4,749,873 | 6/1988 | Mutoh et al. ................... | 307/10 AT |
| 4,754,255 | 6/1988 | Sanders et al. ....................... | 340/63 |

Primary Examiner—Gary Chin
Attorney, Agent, or Firm—Sughrue, Mion, Zinn, Macpeak & Seas

[57] ABSTRACT

A harm preventive mode for a vehicle is established upon detection of a condition that there is no occupant within the vehicle and the doors of the vehicle are closed, or an out-of-use condition of the vehicle, until the doors are unlocked by authentic unlocking means such as a door key. Measures which can be taken to prevent harm when the harm preventive mode is established include controlling the attitude of a driver's seat and/or steering wheel to reduce the spacing therebetween to resist against an attempted seating, energizing a horn or headlamp to bluff an aggressor or interrupting a fuel supply. In addition, various other conditions may be used in establishing the harm preventive mode. In this manner, a variety of effective measure to prevent harm to the vehicle can be taken.

70 Claims, 28 Drawing Sheets

HARM PREVENTING APPARATUS FOR VEHICLE

BACKGROUND OF THE INVENTION

The invention relates to the prevention of a theft of a vehicle or articles placed therein and a mischief done to a vehicle.

A vehicle is generally provided with a number of members which cover openings such as side windows including a door window located next to a driver's seat, a door window next to an assistant driver's seat and two other door windows which are disposed adjacent to rear seats; and openings formed in a sun roof (roof panel), a luggage lid and an engine hood. If a user of the vehicle forgets to close these openings or if he leaves selected openings open in order to avoid a temperature rise inside the vehicle, the vehicle is subject to harm in that an article placed within the vehicle may be stolen or an inside locking button or a door lock/unlock knob may be accessible through an opening to be operated to unlock the door. Since these members which cover the openings are disposed to be movable, it is also possible that these members may be externally tampered open, again causing similar harm.

To prevent such harm from occurring, there is proposed a theft preventing apparatus which gives off an alarm whenever an onboard inside locking button is operated before a door is opened. Specifically, the apparatus is provided with a hidden switch which turns an alarm unit on and off. The switch may be operated by a driver to disable the alarm function after he has gotten into the vehicle, and is operated to enable the alarm function when the vehicle is parked.

There is also proposed a theft preventing apparatus which gives off an alarm in response to the detection of an oscillation of the vehicle or a change in the electric potential of the car body. As before, a hidden switch which is provided in this apparatus may be operated to enable an alarm function when the vehicle is parked. If an opening such as a side window or that formed in the sun roof is tampered with, a resulting oscillation of the vehicle or a change in the electric potential of the car body may be detected to give off an alarm.

The both theft preventive apparatus mentioned above are troublesome and unreliable in operation since the setting or resetting of the alarm function of the apparatus is left to the driver of the vehicle. Specifically, if the driver forgets to set the alarm function, the latter function cannot be activated. Conversely, if the driver forgets to reset the alarm function, the theft preventing apparatus will be effectively activated when an owner driver is using the vehicle. In particular, in respect to the latter aspect, there is a difficulty in the timing of setting and resetting the apparatus since an oscillation of the vehicle or a change in the electric potential of the car body is caused as the driver gets on or off the vehicle. Because malfunctioning is frequently experienced, the driver tends to be reluctant to the use of the apparatus.

Finally, if the theft preventing apparatus is set operative, it is possible to open an engine hood by operating an engine hood unlatch knob disposed adjacent to the driver's seat which may be accessible through an opening, thus disconnecting the power line to shut down the operation of the system. A sufficient length of time is then available for an aggressor to remove the theft preventing apparatus or to hunt for any article left within the vehicle. Thus it will be seen that a conventional theft preventing apparatus involves various inconveniences and provides a reliability which is less than desired inasmuch as a collective guard against every possible harm is not provided.

SUMMARY OF THE INVENTION

It is an object of the invention to positively prevent harm associated with a vehicle such as a theft of a vehicle or any article placed therein and a mischief done to a vehicle.

The above object is accomplished in accordance with the invention by providing a harm preventing apparatus for vehicle comprising first detector means which detects the presence or absence of an occupant onboard a vehicle, second detector means which detects an open/closed condition of an onboard door, and third detector means which detects the fact that unlock means has operated upon an onboard door lock mechanism. When the first detector means has detected the absence of an occupant and the second detector means has detected the closed condition of the onboard door, a harm preventive mode is established. When the third detector means has detected that the unlock means has operated, this mode is terminated.

More specifically, when there is no occupant within the vehicle and the onboard door is closed, this represents a condition in which the vehicle is not in use, and may be parked, for example. By way of example, if the closed condition of the onboard door is defined as a condition in which the onboard door is closed and locked, a legitimate driver, who may be an owner of the vehicle or one who is authorized to use the vehicle, may use a door key to unlock the door. In this instance, a time interval since the occupant leaves the vehicle, and the onboard door is closed and locked until the door key is used represents a time period during which a legitimate driver is absent, during which a harm preventive mode is established in accordance with the invention.

An additional requirement or requirements may be added to establish the harm preventive mode, thus allowing for a variety of measures to be taken against possible harm, which will be considered below in connection with several examples.

(1) Without additional requirement: The harm preventive mode is established immediately upon the detection of the absence of an occupant and the closed door condition. In this instance, if a member which is used to cover a side window or an opening in a sun roof is left open, a standby position is automatically established, guarding against an unauthorized ingress through an opening or a theft of an article which is left placed within the vehicle. More positively, a driving of the vehicle by an unauthorized aggressor may be disabled by driving either a steering unit or a driver's seat to reduce the spacing therebetween. These units may be returned to their original positions whenever the harm preventive mode is terminated in response to the detection of the use of a door key or the like, thus presenting no inconvenience to a legitimate driver.

(2) The harm preventive mode may be established in response to the detection of an open door condition or the presence of an occupant after the absence of an occupant and the closed door condition have been detected and before the use of a door key or the like is detected. This corresponds to a tampering a door open or an operation of an inside locking button through a side window or an opening in a sun roof which is left open to avoid a temperature rise within the vehicle. In such instance, either a steering unit or a driver's seat may be driven to reduce the spacing therebetween to disable a driving of the vehicle by an unauthorized aggressor. Alternatively, a luggage lid or engine hood may be locked to inhibit a shutdown of the system as a result of the disconnection of the power line. Alternative measures may also be taken as by scaring or bluffing the unauthorized aggressor or giving off an external warning through the energization of a horn or headlight in combination.

(3) The harm preventive mode may be established in response to the detection of a running of the vehicle through a given distance or of the passage of a given length of time after the absence of an occupant and the closed door condition have been detected and before the use of a door key or the like is detected. In this instance, the harm preventive mode will be established during the time while the vehicle is being stolen, but provide an effective guarding measure against harm, by utilizing this in combination with one of other measures mentioned above, in that this functioning is activated when the unauthorized aggressor has successfully defeated the harm preventing measure as mentioned above to steal the vehicle and is feeling easy. The guard measure may include the interruption of a fuel supply system either alone or in combination with the energization of a horn.

In this manner, selected requirements may be required to establish a harm preventive mode to provide effective measures guarding against possible harm. In addition, these measures may be used in combination for added effectiveness.

Other objects and features of the invention will become apparent from the following description of an embodiment thereof with reference to the drawings.

BRIEF DESCRIPTION OF THE DRAWINGS

FIG. 4b is a right-hand side elevation of FIG. 4a;

FIG. 4c is a rear view of FIG. 4a;

FIG. 4d is a cross section taken along the line IVD—IVD shown in FIG. 4a;

DETAILED DESCRIPTION OF EMBODIMENTS

Figure 1:
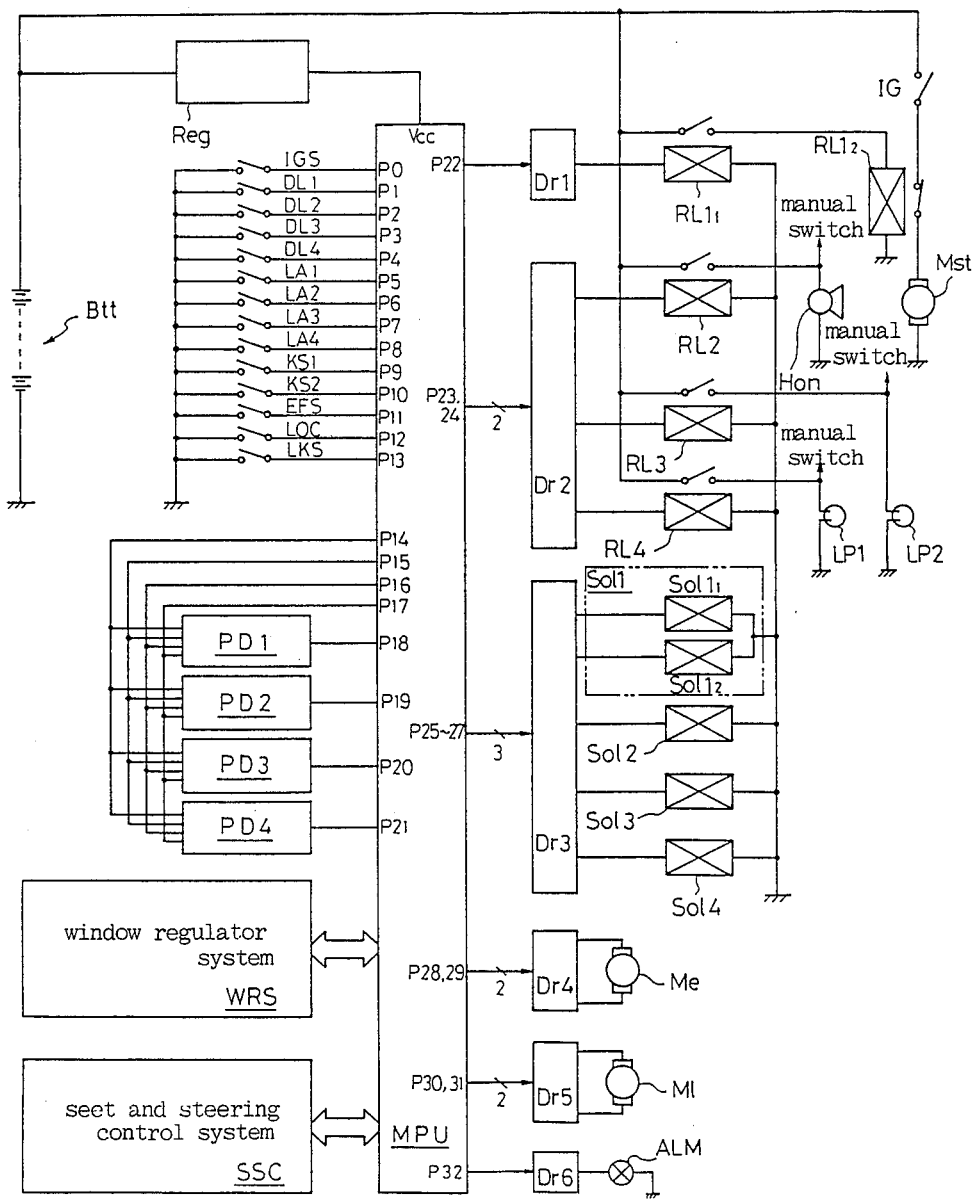
FIG. 1 is a block diagram of an electrical control system of a harm preventing apparatus for vehicle according to one embodiment of the invention.

Referring to FIG. 1, there is shown a block diagram of an electrical control system of a harm reventing apparatus for vehicle according to a first embodiment of the invention. The electrical control system essentially comprises a microprocessor MPU as its central component, and the microprocessor MPU includes various ports which are connected to a variety of switches, an occupant detector circuit, a window regulator system WRS, a seat and steering control system SSC and various drivers. The microprocessor MPU is fed with a constant voltage Vcc from an onboard battery Btt through a constant voltage supply Reg.

Figure 19:
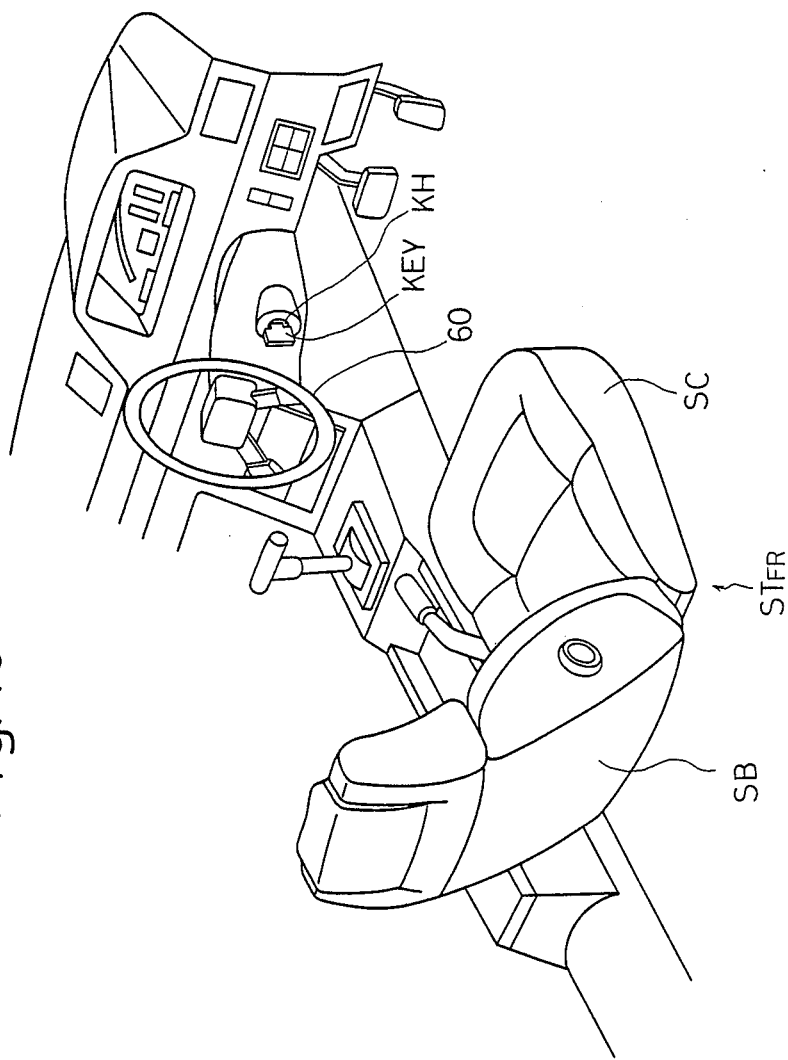
FIG. 19 illustrates part of the interior of a vehicle in which the apparatus according to the second embodiment is mounted.

An ignition key switch IGS is inserted into an ignition key receptacle (shown at KH in FIGS. 19 and 20), and is turned on providing an L level or "0" at port P0 when an ignition key (shown at KEY in FIGS. 19 and 20) is inserted therein.

Door lock switches DL1, DL2, DL3 and DL4 are associated with door lock solenoids Sol1, Sol2, Sol3 and Sol4, respectively, which are in turn associated with a front right-hand door (adjacent to a driver's seat), a front left-hand door (adjacent to an assistant driver's seat), a rear right-hand door and a rear left-hand door, respectively, and are turned on when the respective doors are unlocked, thus providing an L level or "0" at individual ports P1, P2, P3 and P4, respectively.

Door latch switches LA1, LA2, LA3 and LA4 of a door latch mechanism are associated with a front right-hand, a front left-hand, a rear right-hand and a rear left-hand door, respectively, and are turned on when the respective doors are unlatched, thus providing an L level or "0" at individual ports P5, P6, P7 and P8, respectively.

Door key switches KS1 and KS2 are disposed in door key cylinders of a front right-hand door and a front left-hand door, respectively, and are turned on when a door key is inserted into the respective door key cylinder and is then turned, providing an L level or "0" at individual ports P9 and P10, respectively.

The door lock mechanism and the door latch mechanism will now be described specifically with reference to FIGS. 2a, 2b, 2c, 3a, 3b, 4a, 4b, 4c, 4d and 4e.

Figure 2A:
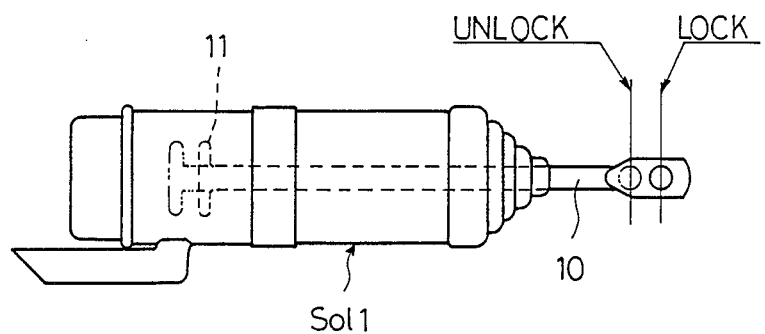
FIG. 2a is a front view of a door lock solenoid Sol1 shown in FIG. 1, showing the appearance thereof.
Figure 2B:
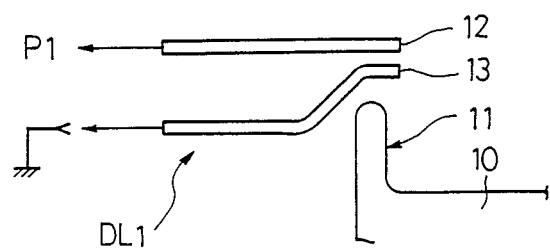
FIG. 2b is a front view of a door lock switch DL1 which is internally housed within the door lock solenoid Sol1.

FIG. 2a shows the appearance of the door lock solenoid So 1 associated with a front right-hand door. This solenoid is a bilateral solenoid, internally including a pair of solenoids $Sol1_1$ and $Sol1_2$. When the solenoid $Sol1_1$ is energized, a plunger 10 is driven to the left as viewed in FIG. 2a (indicated by position UNLOCK) while when the solenoid $Sol1_2$ is energized, the plunger 10 is driven to the right as viewed in FIG. 2a (position LOCK). Within the assembly, the plunger 10 is formed with a flange 11, which operates upon the door lock switch DL1 in a manner shown in FIG. 2b, thus providing a connection between switch leads 12 and 13 of the switch DL1 when the plunger 10 assumes its unlock position. Remaining door lock solenoids Sol2, Sol3 and Sol4 are constructed in a similar manner, but these solenoids are unilateral solenoids, which drive respective plungers to their lock position (or position LOCK) when energized.

Figure 2C:
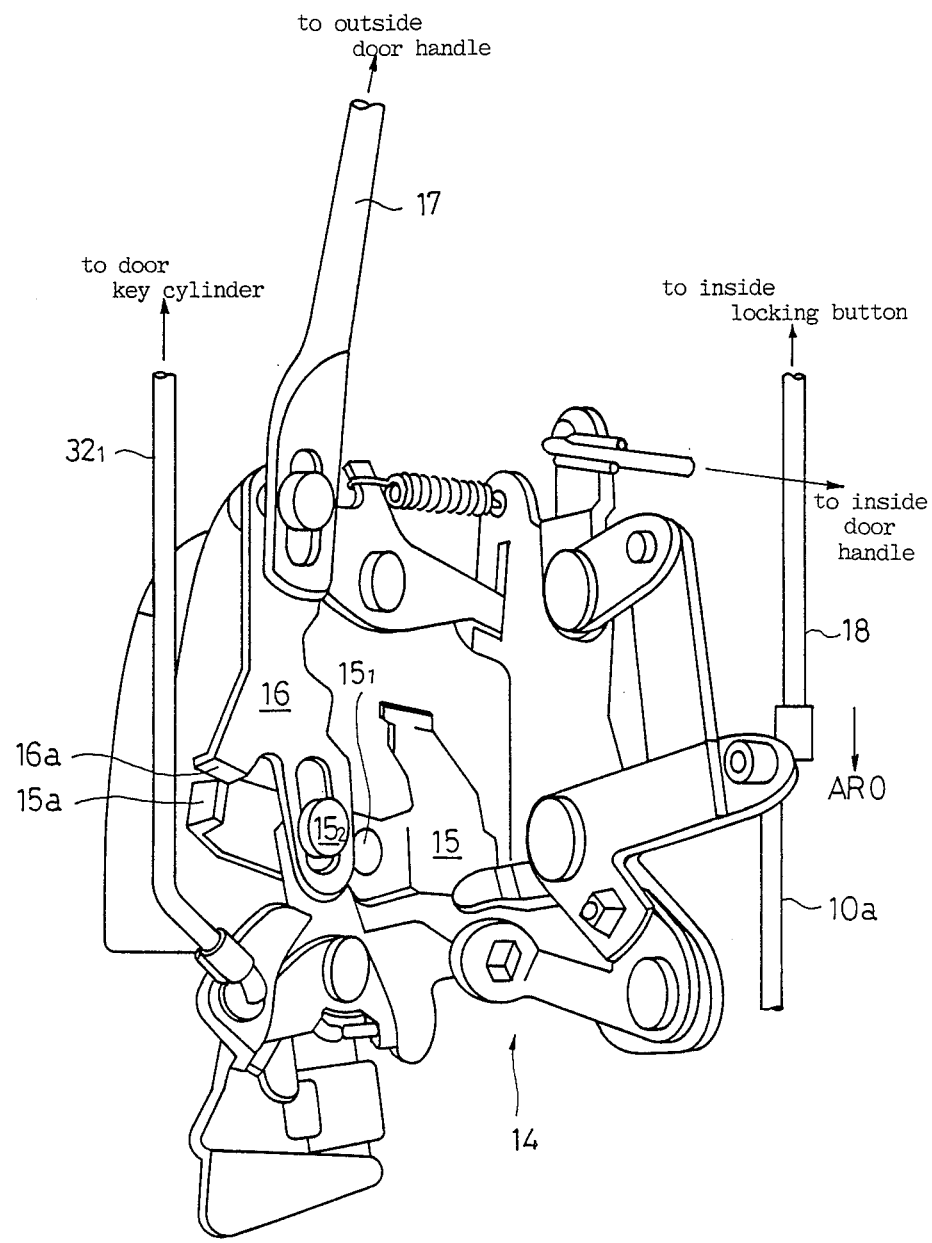
FIG. 2c is a perspective view showing a door lock mechanism in detail.

The solenoid Sol1 engages the door lock mechanism for the front right-hand door, shown in FIG. 2c, for driving the mechanism for purpose of locking and unlocking the same. The door lock mechanism will be described with reference to FIG. 2c. The mechanism is shown in its unlock condition in FIG. 2c. Under this condition, an unlatch plate 15 and a pushing plate 16 engage each other at their bends 15a, 16a, whereby an outside door handle (not shown, which is attached to the outside door) may be operated to cause the unlatch plate 15, which is pivotally mounted on a pin ($22_1$ shown in FIG. 3a) secured to the housing of the mechanism, to rotate counter-clockwise, as viewed in FIG. 2c, about a pivot $15_2$, by acting through a rod 17 and the pushing plate 16. This in turn causes the unlatch plate 15 to act through a pin $15_1$ to angularly drive a detent lever 22 (FIG. 3a) of the door latch mechanism, which will be described later, thus unlatching the door latch mechanism or allowing the door to be opened.

The plunger 10 of the door lock solenoid Sol1 is connected through a linkage, not shown, to a rod 10a which is driven in the direction of an arrow AR0 when the plunger 10 is driven outward while the rod 10a is driven in the opposite direction from that indicated by the arrow AR0 when the plunger 10 is pulled inward or assumes its unlock position. When the rod 10a is driven in the direction of the arrow AR0, it acts through a linkage 14 to displace the pushing plate 16 downward, as viewed in FIG. 2c, thus disengaging the unlatch plate 15 and the pushing plate 16 from each other at their bends 15a, 16a. Accordingly, the unlatch plate 15 ceases to rotate if the outside handle is operated. This represents a locked condition.

When the rod 10a is driven in the opposite direction from that indicated by the arrow AR0, it acts through the linkage 14 to push the pushing plate 16 upward, whereby the unlatch plate 15 and the pushing plate 16 are brought into engagement with each other at their bends 15a, 16a, resuming the condition illustrated in FIG. 2c.

When an inside locking button (not shown) is depressed to drive a rod 18 in a direction indicated by the arrow AR0 or when a door key cylinder, to be described later, is turned to drive a rod $32_1$ downward, as viewed in FIG. 2c, a locked condition is achieved in the similar manner as mentioned above. Conversely, when the inside locking button is withdrawn to drive the rod 18 in the opposite direction from that indicated by the arrow AR0 or when the door key cylinder is turned to drive the rod $32_1$ to the left, as viewed in FIG. 2c, the unlock condition is achieved in the similar manner as mentioned above. When these members are driven in this manner, the plunger of the solenoid Sol1 is mechanically driven to assume its lock or unlock position. When an inside door handle (not shown) which is attached to the inside of a door is operated, the unlatch plate 15 is angularly moved independently from the lock/unlock condition. This provides for an emergency escape in the event of an accident. Remaining door lock mechanisms which are not shown, namely, those associated with front left-hand door, rear right-hand and rear left-hand doors are constructed in substantially the same manner as mentioned above.

Figure 3A:
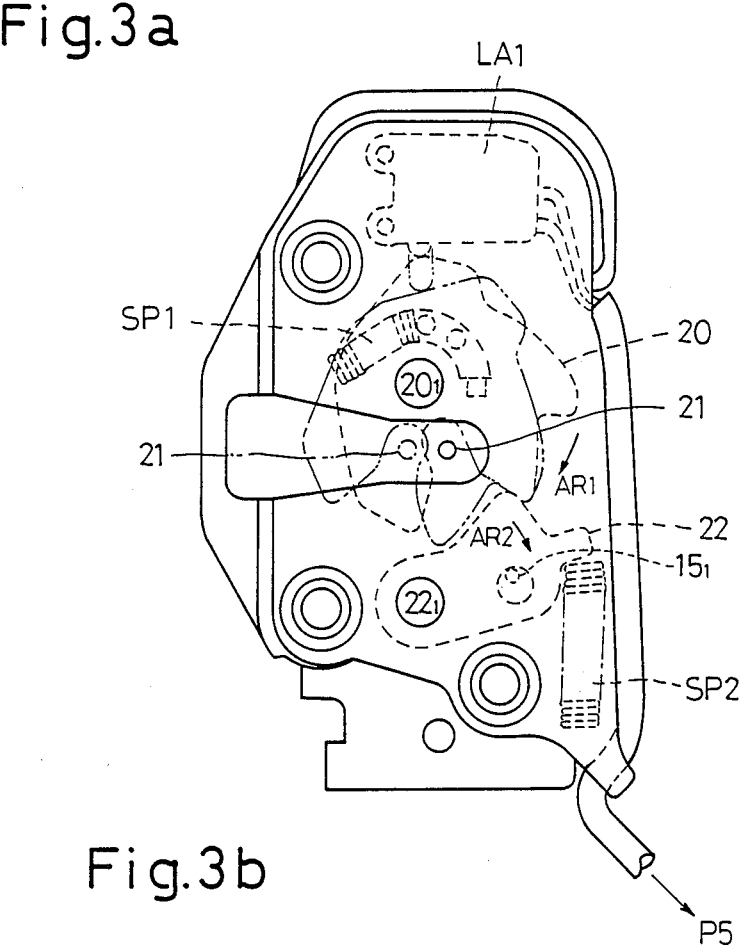
FIG. 3a is a front view showing a door latch mechanism in detail.

FIG. 3a shows the construction of the door latch mechanism associated with a front right-hand door. The door latch mechanism essentially comprises a forked bolt 20, a detent lever 22 and a striker 21 which is disposed on the part of a car body, and also internally houses a door latch switch LA1. The forked bolt 20 is pivotally mounted on a pin $20_1$, and is urged to rotate clockwise or in a direction indicated by an arrow AR1, by a coiled compression spring SP1. The detent lever 22 is pivotally mounted on a pin $22_1$, and is urged to rotate counter-clockwise or in a direction opposite to that indicated by an arrow AR2 by a coiled compression spring SP2. In FIG. 3a, the left side corresponds to the interior of a vehicle. A fully latched condition in which the forked bolt 20 has been sufficiently rotated counter-clockwise to receive the striker 21 therein and its further rotation is constrained by the detent lever 22 is indicated by broken lines in FIG. 3a. A primary latched condition or semi-closed door condition in which the forked bolt 20 has engaged with the striker 21 but has not sufficiently rotated even though it is constrained by the detent lever 22 is shown in phantom lines in FIG. 3a.

The unlatch plate 15 of the door lock mechanism fixedly carries the pin $15_1$ which is engaged with the detent lever 22 as shown. Accordingly, as the unlatch plate 15 rotates, the detent lever 22 is driven by the pin $15_1$ for rotation in the direction of the arrow AR2, thereby freeing the forked bolt 20 from constraint thereof and allowing the bolt to rotate in the direction of the arrow AR1 under the reaction of the compression spring SP1 to displace the striker 21 to the left therefrom. When the detent lever 22 is returned immediately, the mechanism will come to a stop in its primary latched condition. However, if it has been rotated sufficiently in the direction of the arrow AR2, the forked bolt 20 will be disengaged from the striker 21 to achieve the unlatched condition. The rotation of the forked bolt 20 under the unlatched condition is controlled by a groove in which the compression spring SP1 is received.

Figure 3B:
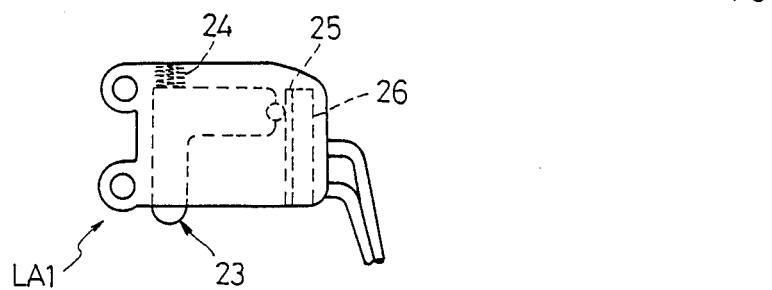
FIG. 3b is a front view of a door latch switch LA1 which is internally housed within the door latch mechanism.

Referring to FIG. 3b, door latch switch LA1 comprises a slide nob 23, a coiled compression spring 24, and switch leads 25 and 26. The slide knob 23 is urged downward by the spring 24 and projects below the switch assembly LA1 as viewed in FIG. 3b. When the knob 23 projects, a connection between the switch leads 25 and 26 is achieved while the connection therebetween is interrupted when the knob is pushed inward (as illustrated in FIG. 3b).

The slide knob 24 of the latch switch LA1 engages part of the forked bolt 20, as shown in FIG. 3a. The knob is driven sufficiently inward by a projecting portion on the forked bolt 20 in its fully latched condition to interrupt the connection between the switch leads 25 and 26 while the knob remains projecting in the primary latched condition and the unlatched condition of the forked bolt to maintain the connection between the switch leads 25 and 26. In the present embodiment, no discrimination is made between the primary latched condition and the unlatched condition, and the condition in which the door latch switch LA1 becomes closed is referred to as the unlatched condition. Remaining door latch mechanisms not shown, namely, those associated with front left-hand, and rear right-hand and left-hand doors are constructed in substantially the similar manner as mentioned above.

Figure 4C:
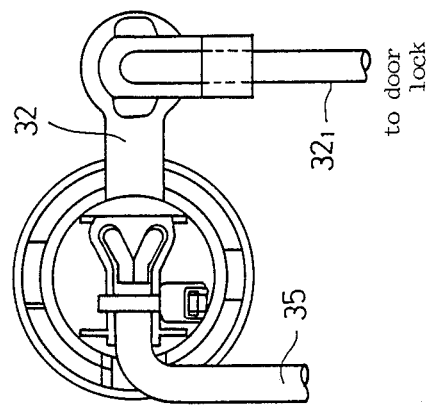
Figure 4B:
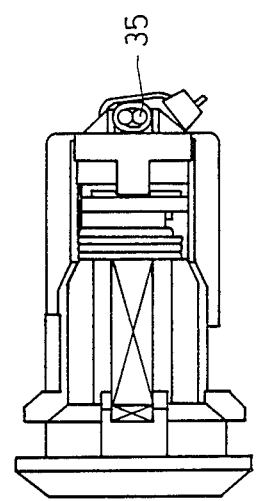
Figure 4A:
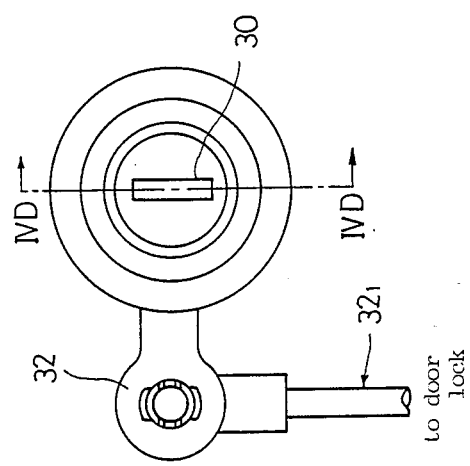
FIG. 4a is a front view of a door key cylinder.
Figure 4D:
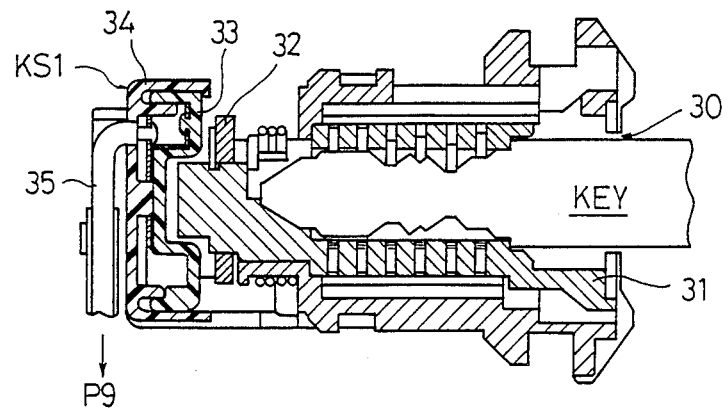

FIG. 4a is a front view of the door key cylinder which is disposed on the front right-hand door; FIG. 4b is a right-hand side elevation; FIG. 4c is a rear view; and FIG. 4d is a cross section taken along the line IV-D—IVD shown in FIG. 4a when a door key KEY is inserted into a door key receptacle 30. It will be appreciated that the door key KEY is common with the ignition key (see FIGS. 19 and 20). When the door key KEY is inserted, six tumblers engage the peaks of the key KEY, whereupon a cylinder 31 is rotatable. When the cylinder 31 rotates clockwise as viewed in FIG. 4a, a coupling plate 32 which is fixedly connected with the cylinder 31 causes a rod $32_1$ to be driven upward as viewed in FIG. 4a. In other words, the rod $32_1$ is driven to the right, as viewed in FIG. 2c, whereupon the door lock mechanism becomes locked. When the cylinder 31 is rotated counter-clockwise, as viewed in FIG. 4a, the rod $32_1$ is driven downward as viewed in FIG. 4a. In other words, the rod $32_1$ is driven to the mechanism becomes unlocked.

Figure 4E:
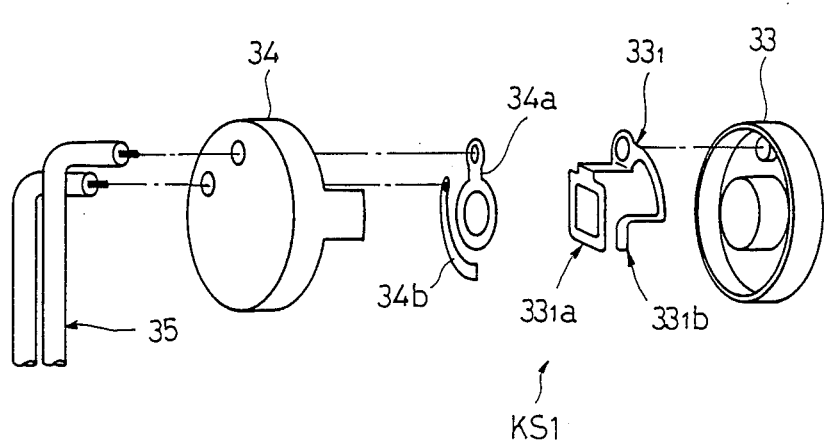
FIG. 4e is an exploded perspective view of a door key switch KS1 which is internally housed within the door key cylinder.

The cylinder 31 is engaged by the door key switch KS1, the construction of which is shown in FIG. 4e. Specifically, the door key switch KS1 comprises a rotary casing 33 to which a switch lead $33_1$ is fixedly connected, and a stationary casing 34 to which switch leads 34a and 34b are fixedly connected. The leads 34a and 34b are connected to the microprocessor MPU through lead wires 35. The rotary casing 33 is fixedly mounted in the key cylinder body. Specifically, the casing 33 is formed with a square pillar in which the cylinder 31 is a tight fit, whereby the casing 33 rotates with the switch lead $33_1$ as the cylinder 31 rotates. As the door key switch KS1 is assembled, the lead 34a bears against a bend $33_{1a}$ of the switch lead $33_1$, whereby as the cylinder 31 is rotated counter-clockwise, as viewed in FIG. 4a, the switch lead 34b bears against a bend $33_{1b}$ of the switch lead 331. Thus, the door key switch KS1 is turned on only when the door key KEY is inserted into the receptacle 30 to unlock the door lock mechanism. The door key cylinder associated with the front left-hand door, not shown, is constructed in the similar manner.

Further details of the door lock mechanism and the door latch mechanism are disclosed in Japanese Patent Application No. 60,067/1986.

Returning to FIG. 1, an engine hood latch switch EFS is connected to a port P11 of the microprocessor MPU and functions to detect the latched/unlatched condition of an engine hood. The switch is turned on when the engine hood is unlatched, thus delivering an L level or "0" to port P11.

Figure 5A:
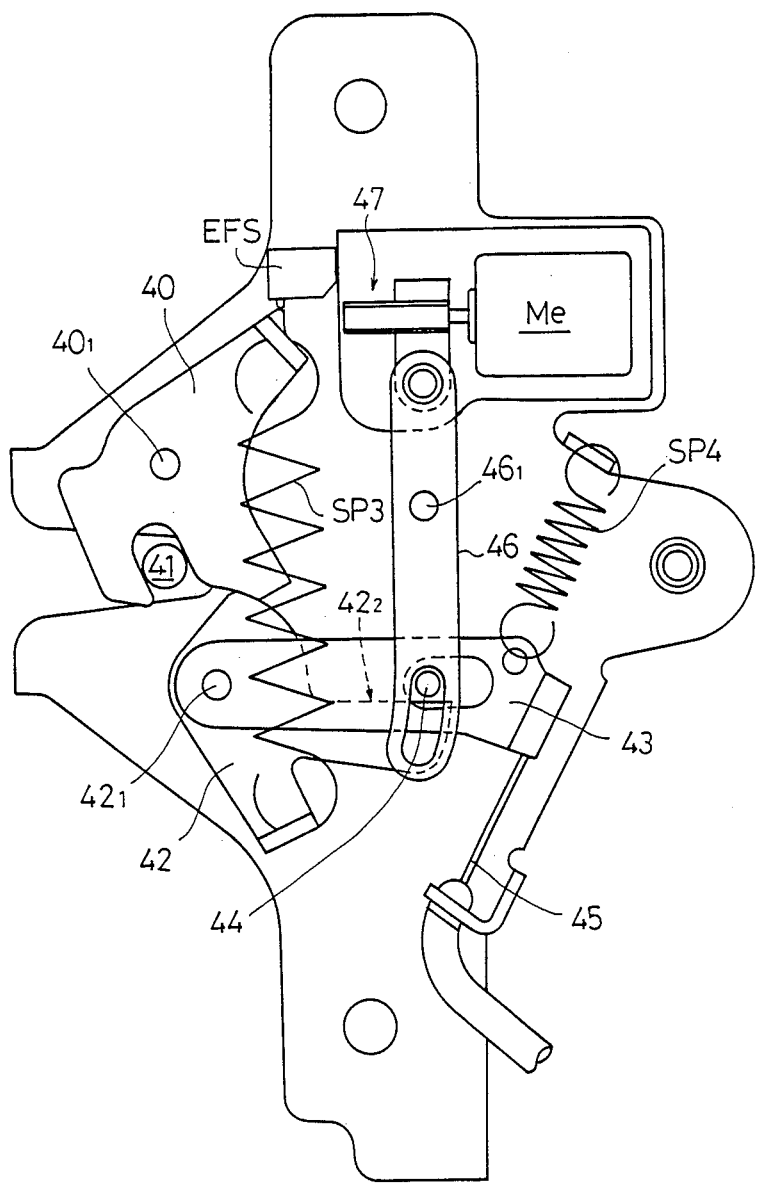
FIGS. 5a and 5b are front views showing the detail of a latch mechanism and a lock mechanism of an engine hood, respectively.
Figure 5:
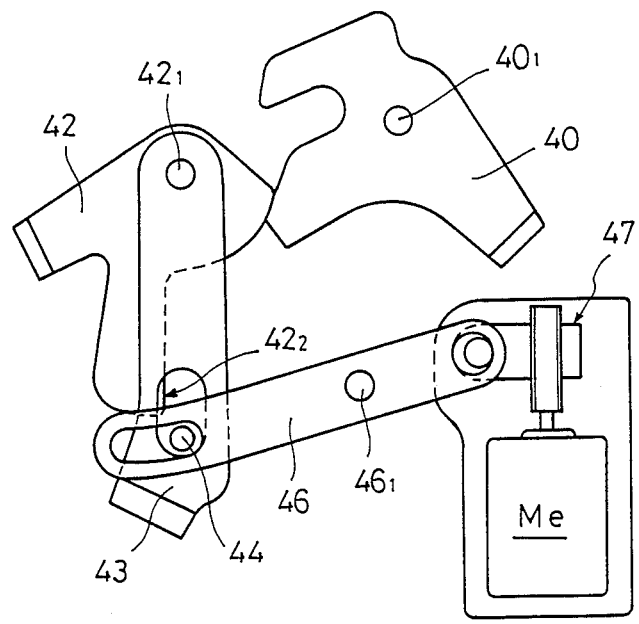

Reference is now made to FIGS. 5a and 5b for describing a latch mechanism and a lock mechanism associated with the engine hood. The latch mechanism essentially comprises a latch lever 40 and a detent lever 42 which is disposed on a car body and a striker 41 which is disposed on the engine hood. The latch lever 40 is pivotally mounted on a pin $40_1$, secured to a baseplate, while the detent lever 42 is pivotally mounted on a pin $42_1$, also secured to the baseplate, and the both are urged to rotate clockwise and counter-clockwise, respectively, by a coiled tension spring SP3. FIG. 5a shows a fully latched condition in which the latch lever 40 has sufficiently rotated counter-clockwise while being engaged with the striker 41 and its further rotation is constrained by the detent lever 42. Under this condition, the slide knob of the engine hood latch switch EFS, which is constructed in the same manner as the door latch switch LA1 shown in FIG. 3b, is driven by a projecting portion of the latch lever 40 to open the switch.

The lock mechanism essentially comprises an unlatch lever 43, a rocking pin 44, a lift lever 46 and a motor Me. The unlatch lever 43 is pivotally mounted on the pin $42_1$ while the lift lever 46 is pivotally mounted on a pin $46_1$, secured to the baseplate. One end of the lift lever 46 is engaged with the rocking pin 44 while its other end is coupled through a screw pair 47 to be engaged with the output shaft of the motor Me. FIG. 5a illustrates the unlocked condition in which the unlatch lever 43 engages with the detent lever 42 through the rocking pin 44, whereby when an engine hood unlatch knob, not shown, which is provided adjacent to the driver's seat, is operated, a wire 45 is pulled, rotating the detent lever 42 clockwise through the unlatch lever 43 and the rocking pin 44. In this manner, the latch lever 40 is freed from constraint against its rotation, and thus drives the striker 41 upward, as viewed in FIG. 5a, assuming the unlatched condition. In the unlatched condition, the slide knob of the engine hood latch switch EFS projects to turn the switch EFS on.

When the motor Me is energized for rotation in the reverse direction, its rotation is transmitted through the screw pair 47 to rotate the lift lever 46 counter-clockwise about the pin $46_1$. This causes the rocking pin 44 which is engaged with one end of the lift lever 46 to be moved down, as viewed in FIG. 5b, whereby the unlatch lever 43 and the detent lever 42 are disengaged from each other as shown in FIG. 5b. This represents the locked condition. Under this condition, if the engine hood unlatch knob is operated to pull the wire 45, the detent lever 42 cannot move angularly, preventing the engine hood from being unlatched. When the motor Me is energized for rotation in the forward direction, such rotation is transmitted through the screw pair 47 to rotate the lift lever 46 clockwise about the pin $46_1$, whereby the unlocked condition shown in FIG. 5a is resumed.

A luggage lid latch switch LOC which detects the latched/unlatched condition of a luggage lid is connected to a port P12 of the microprocessor MPU shown in FIG. 1, and is turned on when the luggage lid is unlatched, delivering an L level or "0" to the port P12.

The latch mechanism and the lock mechanism of the luggage lid is substantially similar to the engine hood latch mechanism and the lock mechanism which have been described above with reference to FIGS. 5a and 5b, and therefore will not be specifically described nor illustrated. However, it is to be noted that the lock mechanism for the luggage lid is provided with a luggage lid key cylinder which is constructed in substantially the same manner as the door key cylinder which has been described with reference to FIGS. 4a to 4e. Accordingly, a rod corresponding to the rod 32 which is driven by the rotation of the cylinder 31 is connected in parallel relationship with a wire which corresponds to the wire 45 (FIG. 5a). Consequently, in the unlocked condition, either a luggage lid unlatch knob which is provided within the vehicle or a luggage lid key cylinder may be operated to unlatch the luggage lid. A luggage lid key switch LKS, which is constructed in substantially the same manner as the door latch switch LA1 mentioned previously and associated with the luggage lid key cylinder, is connected to a port P13 of the microprocessor MPU.

Figure 6A:
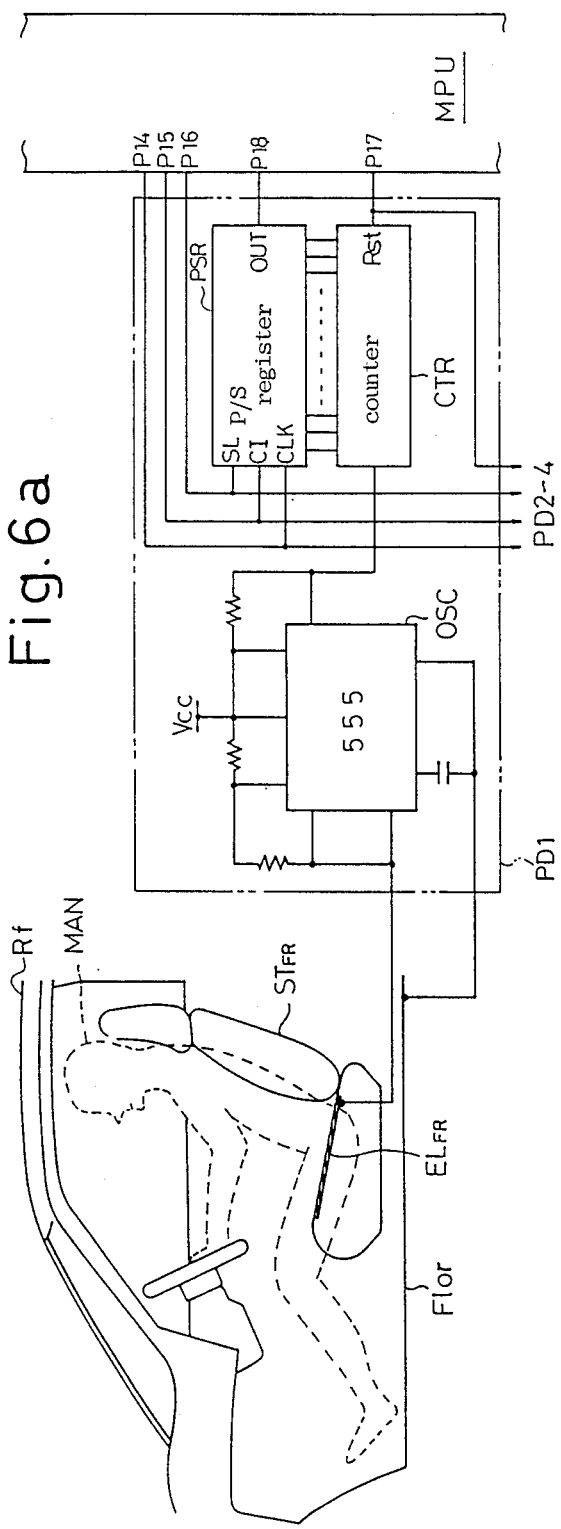
FIG. 6a is a block diagram of an occupant detector circuit PD1 shown in FIG. 1.
Figure 6B:
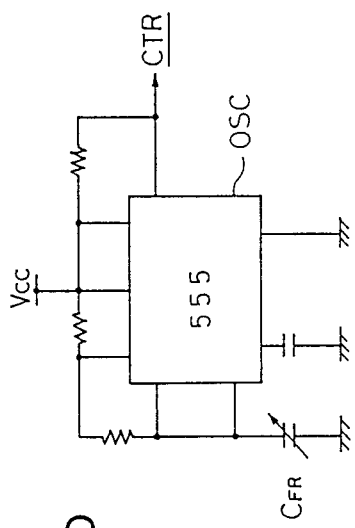
FIG. 6b is a block diagram illustrating an equivalent circuit of part thereof.

Connected to ports P14 to P21 of the microprocessor MPU are a plurality of occupant detector circuits including a circuit PD1 for a front right-hand or driver's seat, circuit PD2 for a front left-hand or assistant driver's seat and circuits PD3 and PD4 for rear right-hand and left-hand seats. Referring to FIGS. 6a and 6b, the occupant detector circuit PD1 which detects the presence or absence of an occupant on the front right-hand seat will be described as a typical example.

Referring to FIG. 6a, the occupant detector circuit PD1 comprises an oscillator OSC, a 16 bit counter CTR and a parallel-in/serial-out shift register (P/S register) PSR. The oscillator OSC has a variable capacitance capacitor $CF_R$ externally connected thereto, which determines the frequency of the oscillator output. In the present embodiment, the oscillator uses a timer IC 555. The frequency of the oscillator decreases with an increasing capacitance and increases with a decreasing capacitance of the capacitor $C_{FR}$. The capacitor $CF_R$ is formed between a detecting electrode $EL_{FR}$ disposed on the front right-hand seat $ST_{FR}$ and the car body such as a roof Rf or floor Flor or the like, which defines the electrical ground.

Figure 6C:
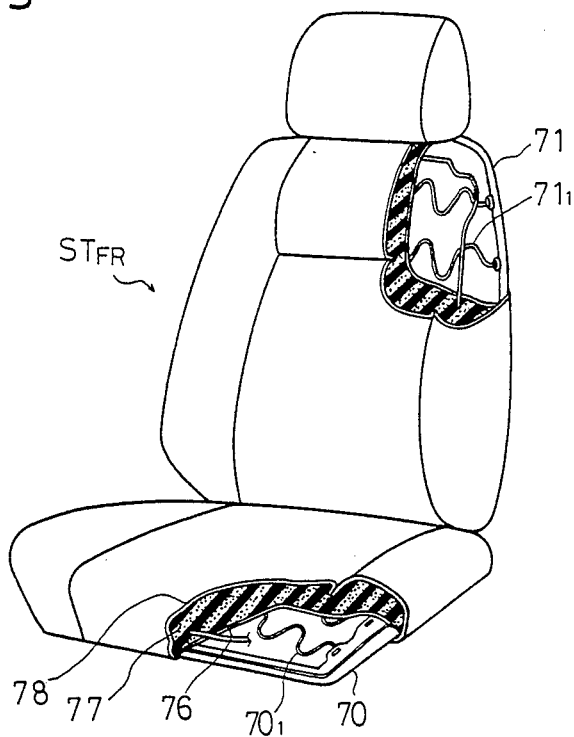
FIG. 6c is a perspective view of a driver's seat $ST_{FR}$ on which a detecting electrode $EL_{FR}$ is mounted.
Figure 6D:
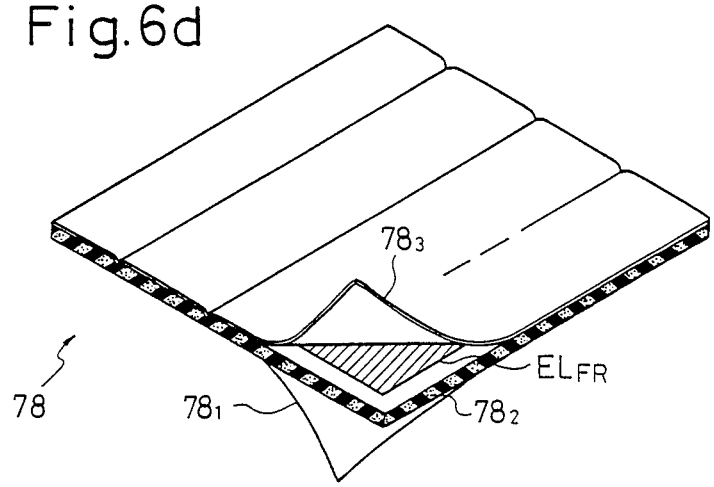
FIG. 6d is a perspective view of part of a trim cover 78.

Reference is now made to FIGS. 6c and 6d. The seat $ST_{FR}$ comprises a frame member including a seat cushion frame 70, a seat cushion spring $70_1$, a seat back frame 71 and a seat back spring $71_1$, and over which a pad support 76, a pad 77 and a trim cover 78 are disposed. As shown in FIG. 6d, the trim cover 78 comprises a wadding cover $78_1$, a wadding $78_2$ and a skin $78_3$, which are combined into a single sheet. The upper surface of the wadding $78_2$ is sputtered with a conductive paint to form the detecting electrode $EL_{FR}$. Because the detecting electrode $EL_{FR}$ is insulated from the car body, it forms a capacitor $C_{FR}$, shown by an equivalent circuit of FIG. 6b, together with the car body. The capacitor exhibits a capacitance which varies depending on the presence or absence of a driver MAN.

An output from the oscillator OSC is applied to the counter CTR, which then functions to count the rising edge of the output signal from the oscillator. The counter CTR has 16 bit parallel output terminals, which are connected to 16 bit parallel input terminals of the register PSR. The counter CTR also has a reset input terminal Rst, which is connected to a port P17 of the microprocessor MPU. The register PSR has a clock input terminal CLK which is connected to a port P14, a clock inhibit input terminal CI connected to a port P15 and a shift load input terminal SL connected to a port P16 of the microprocessor MPU. When a shift load pulse is applied to the shift load input terminal SL, the register PSR is loaded with 16 bit data which is supplied to its parallel input terminals in response to the rising edge of the pulse. When a clock inhibit signal which is applied to the clock inhibit input terminal CI assumes its L or low level, the register delivers the data which is loaded therein from its output terminal OUT to a serial input port P18 of the microprocessor MPU in a serial manner and in synchronism with a clock pulse applied to the clock input terminal CLK.

The operation of the occupant detector circuit PD1 to detect the presence or absence of an occupant will be described later. Remaining occupant detector circuits PD2, PD3 and PD4 which are associated with remaining seats are constructed in the same manner as the circuit PD1.

A window regulator system WRS responds to the operation of opening/closing switches associated with individual windows, not shown, and commands from the microprocessor MPU to drive the glass panes of the front right-hand window adjacent to the driver's seat, the front left-hand window adjacent to the assistant driver's seat, and the rear right-hand and left-hand windows for opening or closing movement. The mechanical construction of the system is illustrated in FIGS. 7a and 7b.

Figure 7A:
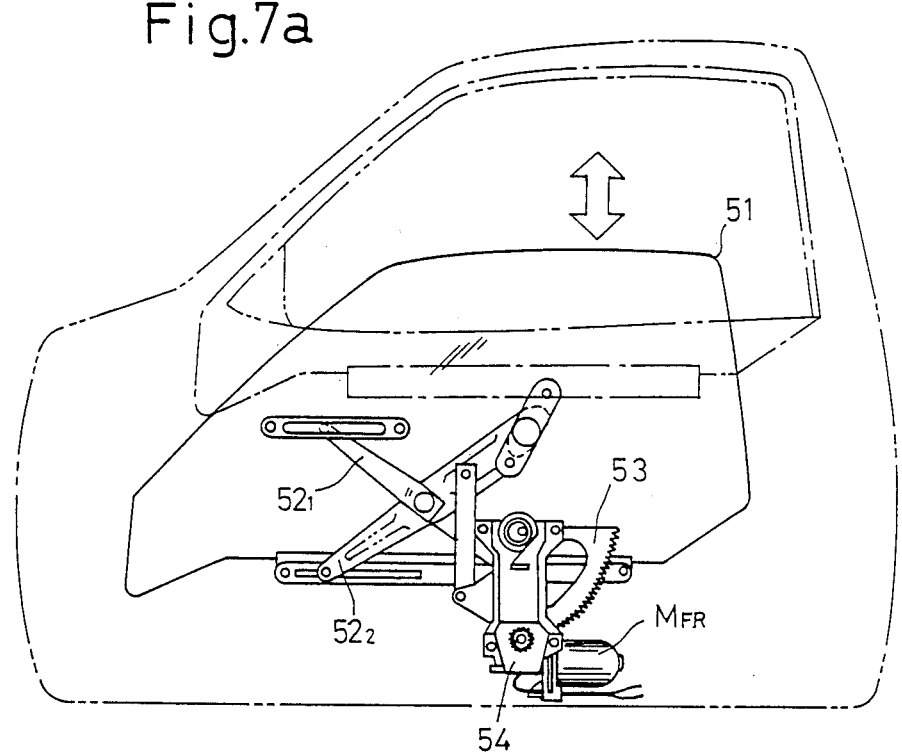
FIG. 7a is a perspective view of a window elevating mechanism associated with a front, right-hand door.
Figure 7B:
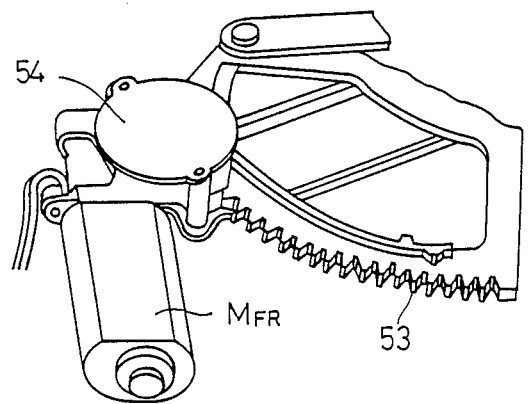
FIG. 7b is a perspective view showing part thereof in detail.

Referring to FIG. 7a, there is shown a side elevation of an electrically driven glass pane elevating mechanism which opens or closes a glass pane 51 of the front right-hand door, as viewed from the inside of the vehicle. The elevating mechanism is of non-parallel type, and essentially comprises a lift arm $52_2$ having a pin located on one end thereof pivotally connected to a stationary portion and another pin which is fastened to a lower guide rail which is secured to the glass pane 51, an equalizer arm $52_1$ having a pin located at one end which is fastened to an upper guide rail secured to a stationary portion and another pin located on the other end thereof which is fastened to a lower guide rail (which is disposed behind a sector gear 53 in FIG. 7a) secured to the glass pane 51, a sector gear 53 coupled to the lift arm $52_2$ through a linkage, a worm wheel assembly 54 and a motor $MF_R$. The combination of the sector gear 53, worm wheel assembly 54 and motor $M_{FR}$ is illustrated in FIG. 7b. The sector gear 53 is in meshing engagement with the wheel of the assembly 54, the worm of which is coupled to the rotary shaft of the motor $MF_R$.

When the motor $M_{FR}$ rotates in the forward direction, such rotation is transmitted through the assembly 54 to rotate the sector gear 53 clockwise as viewed in FIG. 7a, thus raising the glass pane 51 to close the window. The rotation of the motor $M_{FR}$ in the reverse direction causes the sector gear 53 to be rotated counter-clockwise in FIG. 7a, thus lowering the glass pane 51 to open the window. It is to be understood that the elevating mechanisms associated with remaining windows are constructed in the same manner. The operation of the window regulator system WRS in response to an operation of opening/closing switches of the individual windows is described in detail in Japanese Patent Application No. 286,544/1985, and is quoted herein for purpose of reference.

Returning to FIG. 1, a seat and steering control system SSC adjusts the tilt angle and the telescopic length of a steering shaft and adjusts the position of the front right-hand seat in response to the operation of input switches not shown and in accordance with the commands from the microprocessor MPU. The mechanical construction of the system SSC is illustrated in FIGS. 8a, 8b, 8c and 9.

Figure 8A:
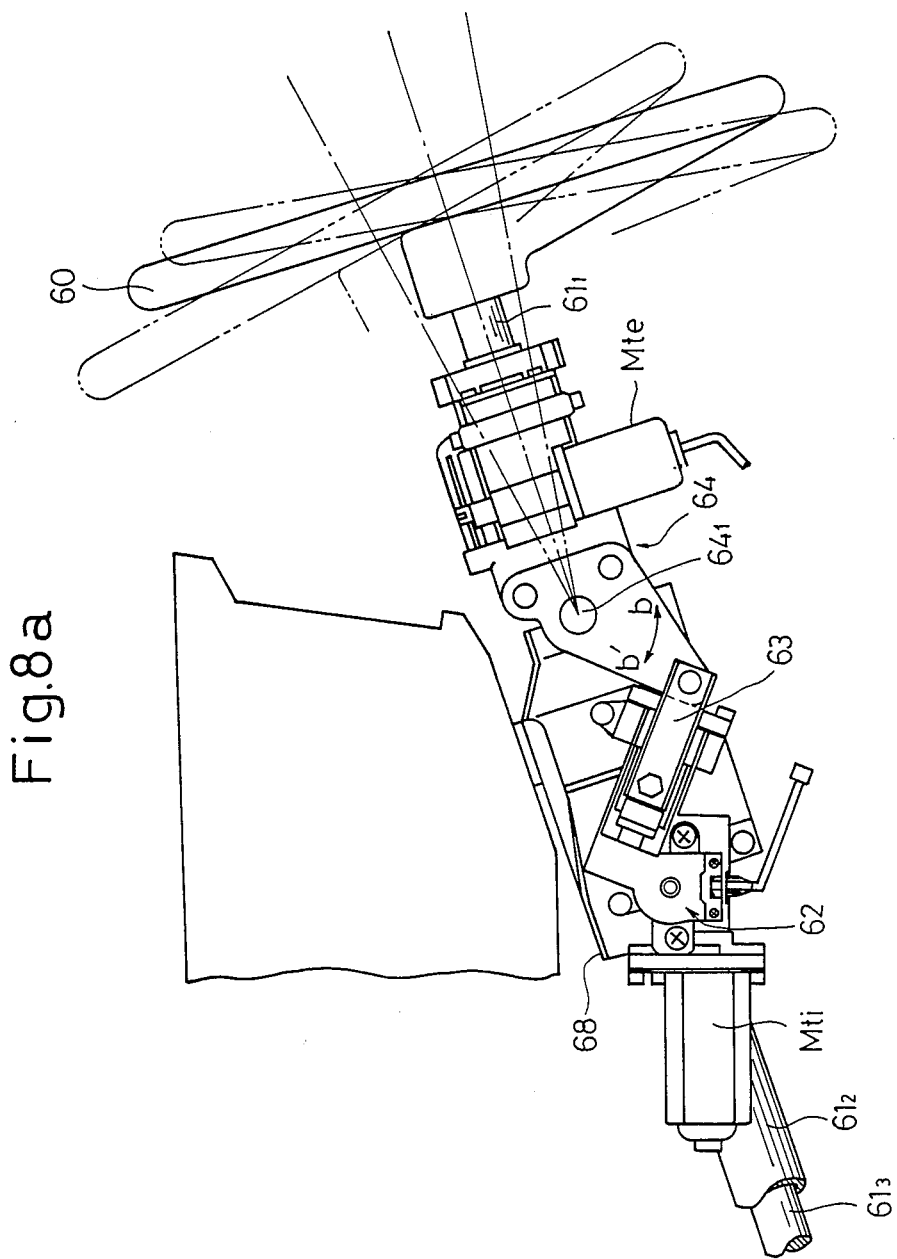
FIGS. 8a and 8b are a side elevation and a cross section of a tilting mechanism and a telescopic mechanism, respectively, of a steering unit.
Figure 8B:
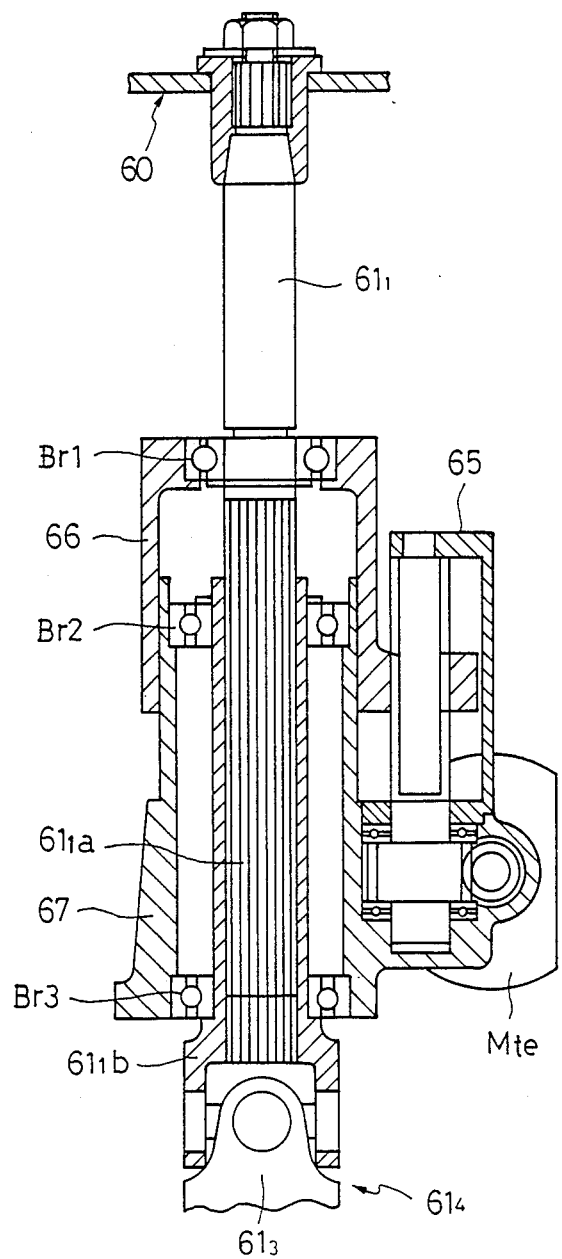
Figure 8C:
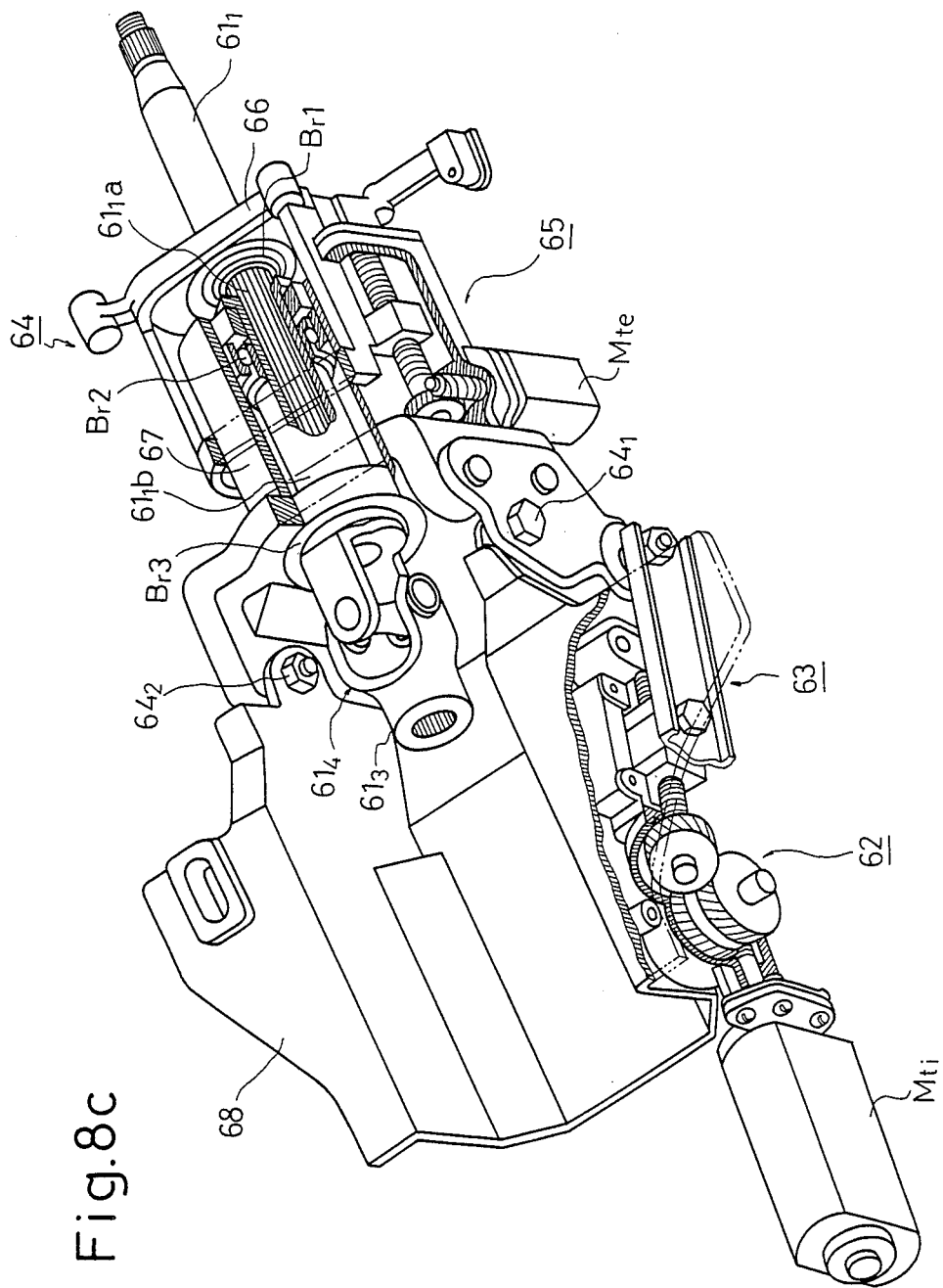
FIG. 8c is a perspective view thereof, partly broken away.

Referring to FIGS. 8a and 8c, the mechanical construction of a tilt steering mechanism will be initially described. A steering wheel 60 is mounted on an upper main shaft $61_1$, which is supported by an upper bracket assembly 64. The upper bracket assembly 64 is pivotally mounted on pins $64_1$ and $64_2$, and fixedly carries a reciprocating unit 63 for a screw pair on its lower end. The unit 63 has an input shaft which is coupled through a worm gear assembly 62 to the output shaft of a motor Mti. Both the motor Mti and the worm gear assembly are mounted on a main bracket 68 which is secured to a car body. Energizing the motor Mti for rotation in either forward or reverse direction results in a reciprocating movement of the unit 63 as a result of transmission through the worm gear assembly 62, whereby the tilt angle of the upper main shaft $61_1$ with respect to a lower main shaft $61_3$ is adjusted. The lower main shaft $61_3$ is supported by a sleeve shaft $61_2$.

Referring to FIGS. 8b and 8c, the mechanical construction of a telescopic steering mechanism will be described. The telescopic steering mechanism is disposed within the upper bracket assembly 64. The lower half of the upper main shaft $61_1$ is formed with slide teeth $61_{1a}$ which extend parallel to the axis thereof for slidable engagement with slide teeth which are formed inside a hollow outer shaft $61_{1b}$. The outer shaft $61_{1b}$ is coupled to the lower main shaft $61_3$ through a universal joint 614 The upper main shaft $61_1$ is pivotally mounted on an outer bracket 66 by means of a bearing Br1, and the outer shaft $61_{1b}$ is pivotally mounted on an inner bracket 67 by means of bearings Br2 and Br3. The outer bracket 66 and the inner bracket 67 slidably engage with each other. A motor Mte is mounted on the inner bracket 67 and has an output shaft which is coupled to the outer bracket 66 through a worm gear assembly 65. Accordingly, energizing the motor Mte for rotation in either forward or reverse direction results in driving through the gear train 65 and the outer bracket 66 to extend or retract the upper main shaft $61_1$, thereby adjusting the telescopic length of the steering apparatus, which is defined as the distance measured from a driver to the steering wheel 60.

Figure 9:
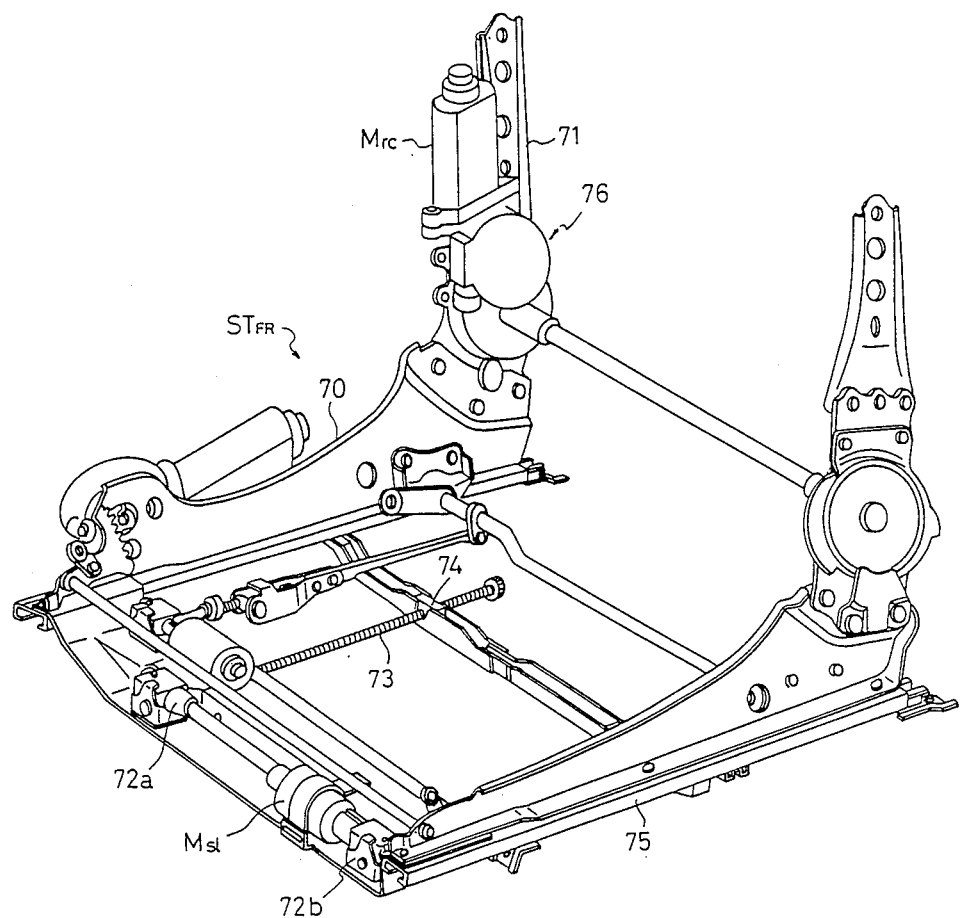
FIG. 9 is a perspective view of a seat adjusting mechanism associated with the driver's seat.

FIG. 9 shows the construction of a seat adjust mechanism. The frame member comprising the seat cushion frame 70 and the seat back frame 71 is mounted on a stationary member 75, which is secured to the floor Flor of the vehicle, so as to be reciprocable. The stationary member 75 fixedly carries a nut 74 thereon, which forms a screw pair together with a worm screw 73. While not shown in FIG. 9, a similar screw pair is disposed within the member 75 near the viewer's side of FIG. 9. A motor Ms1 is mounted on the seat cushion frame 70 and has an output shaft which is coupled through worm gear assemblies 72a, 72b to the worm screw 73 and the other worm screw, not shown. Energizing the motor Ms1 for rotation in either forward or reverse direction results in driving through the worm gear assemblies 72a, 72b to rotate the worm screw 73 and the other worm screw, not shown, either forwardly or reversely, thus moving the seat $ST_{FR}$ forwardly or rearwardly. The seat back frame 71 is pivotally mounted on the seat cushion frame 70. A motor Mrc is mounted on the seat back frame 71 and acts through a worm gear assembly 76 to adjust the angle of the seat back frame 71 with respect to the seat cushion frame 70. The arrangement of the seat and steering control system SSC and its control operation are described in detail in Japanese Patent Application No. 189,454/1984 or Laid-Open Application No. 67,659/1986, to which reference is made.

Returning to FIG. 1, a driver Drl is utilized to energize a relay $RL1_1$. When energized, contacts of the relay $RL1_1$ make to energize a relay $RL1_2$ The relay $RL1_2$ has break contacts which are connected in a supply line to a starter motor Mst. When the relay $RL1_2$ is energized, the supply line is interrupted, preventing the starter motor Mst from being energized by operating a starter switch ST.

A driver Dr2 is connected to relays RL2, RL3 and RL4, and selectively energizes these relays in accordance with a command from the microprocessor MPU. The relay RL2 energizes a horn Hon; relay RL4 energizes a headlamp LP1; and relay RL3 energizes a tail lamp LP2.

A driver Dr3 is connected to door lock solenoids $Sol1_1$, $Sol1_2$, Sol2, Sol3 and Sol4, and selectively energizes these solenoids in accordance with the command from the microprocessor MPU.

A motor driver Dr4 energizes a motor Me which is provided in the lock mechanism associated with the engine hood for rotation in forward or reverse direction. Another motor driver Dr5 energizes the motor Ml which is provided in the lock mechanism associated with the luggage lid for rotation in forward or reverse direction. A driver Dr6 is utilized to energize an alarm unit ALM.

Figure 10A:
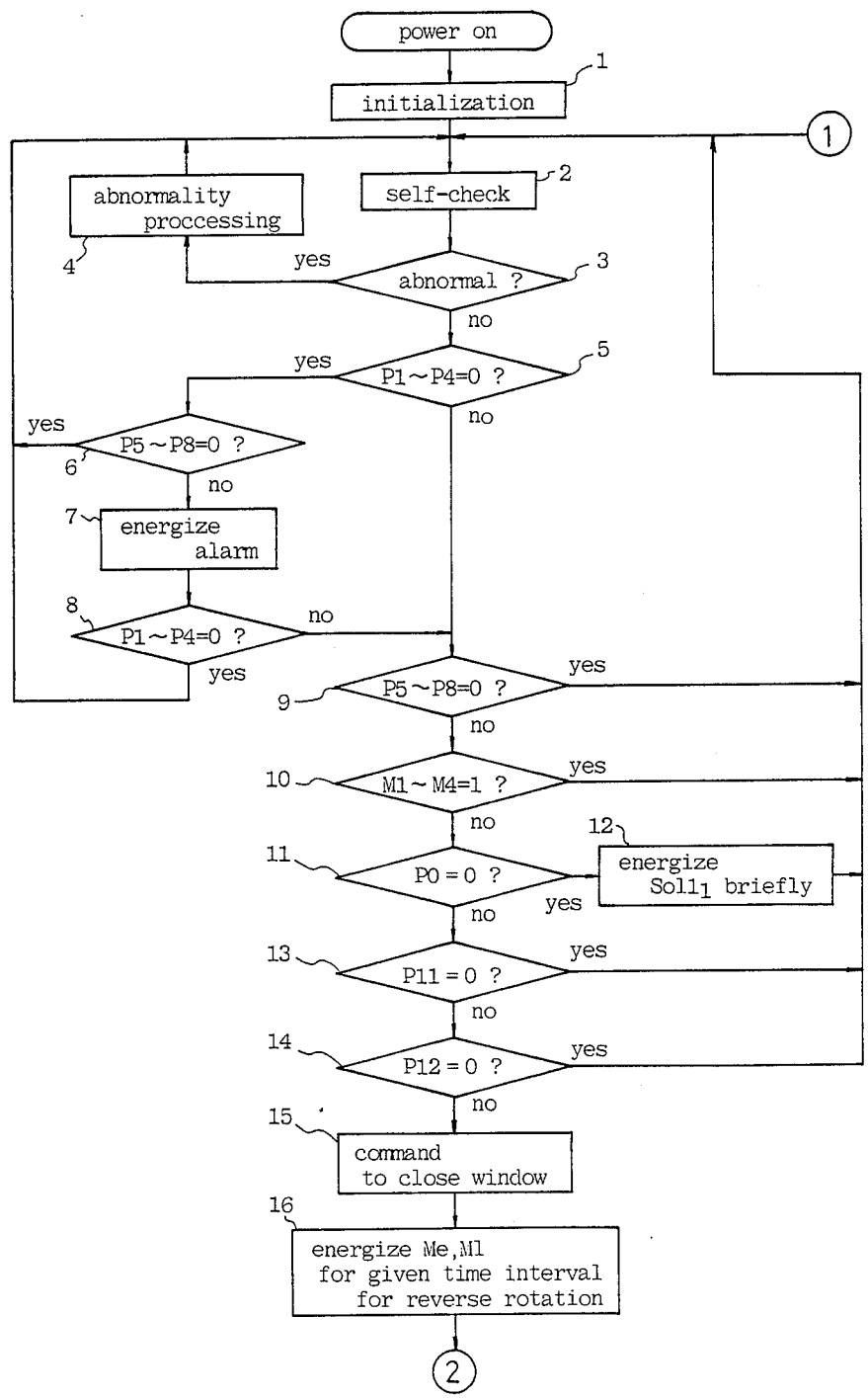
FIGS. 10a and 10b are flowcharts illustrating a control operation by a microprocessor MPU shown in FIG. 1.
Figure 10:
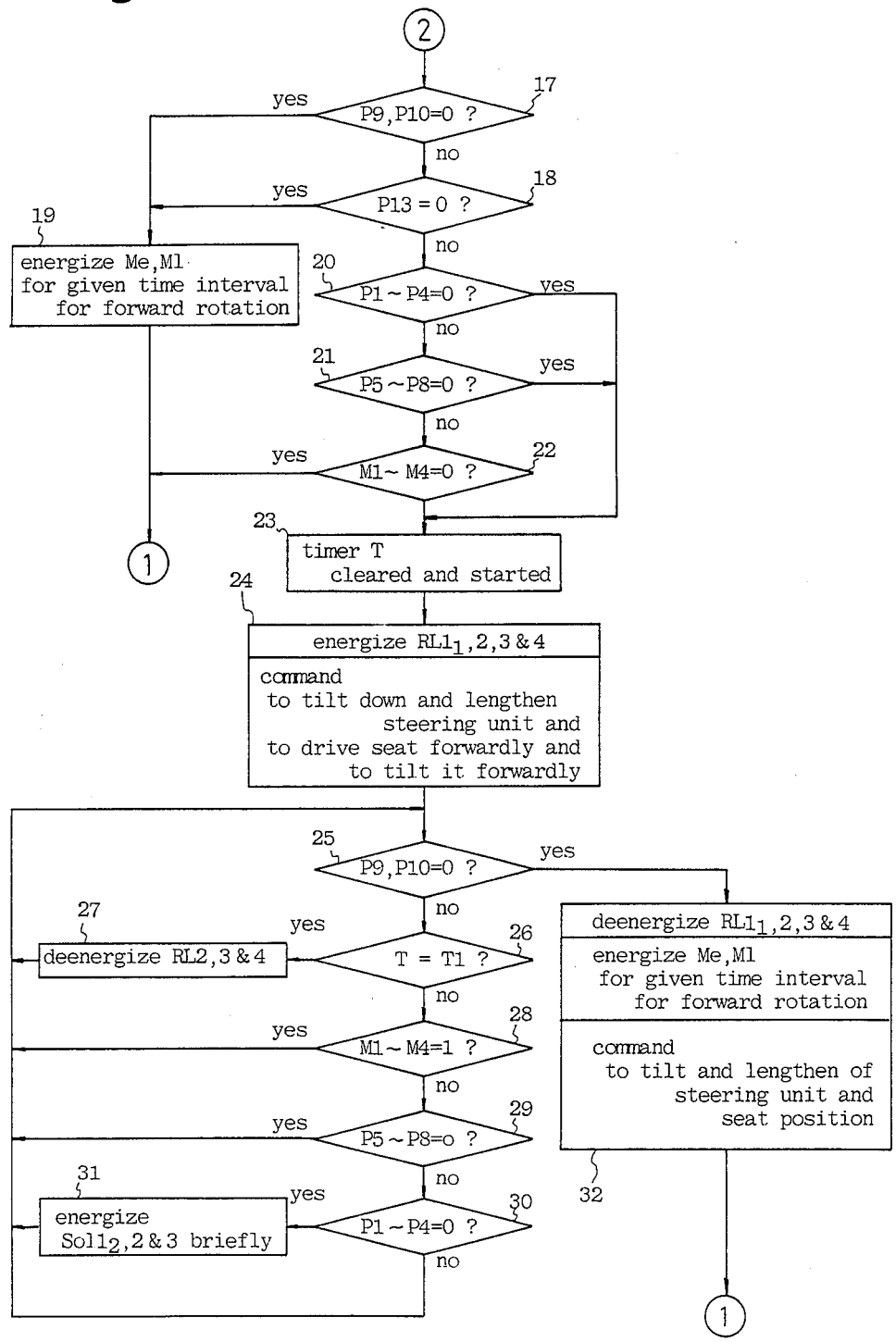
FIG. 10c is a flowchart of a modification.
Figure 10:
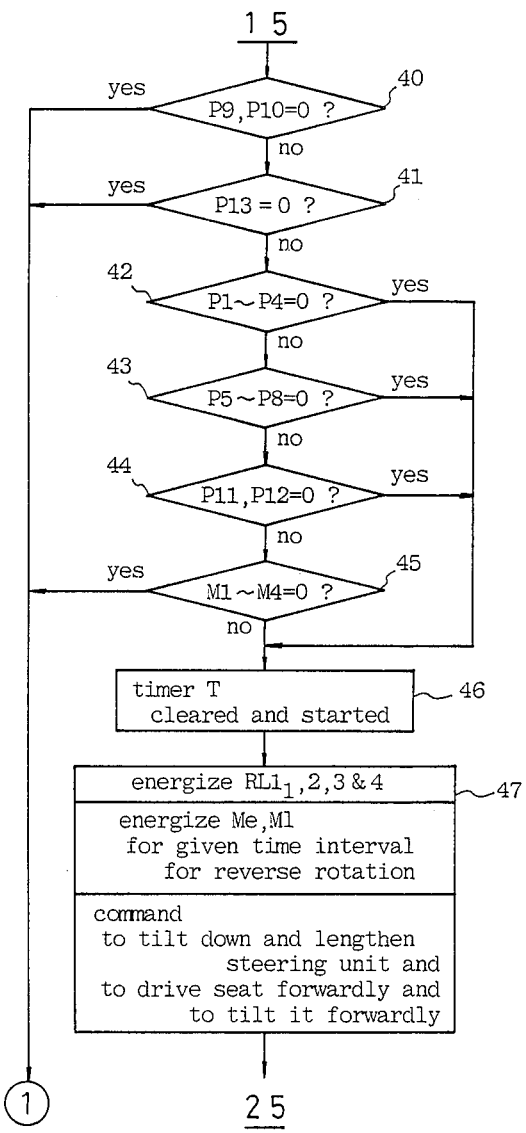

Referring to FIGS. 10a and 10b, a control operation by the microprocessor MPU will now be described. In the description to follow, a particular step in flowcharts shown in these Figures is represented by designation "S . . . ", even though the character "S" representing the step is omitted in the flowcharts.

When an onboard battery Btt is connected, internal memories, output ports and components are initialized at S1. Subsequently, the program repeatedly goes through following steps beginning with S2 in a loop fashion for purpose of execution. However, in response to an interrupt request from an internal timer, a timer interrupt processing operation shown in FIG. 11 is executed at a given time interval, which is chosen to be 0.1 second in the present embodiment, for detecting the presence or absence of an occupant.

Figure 12:
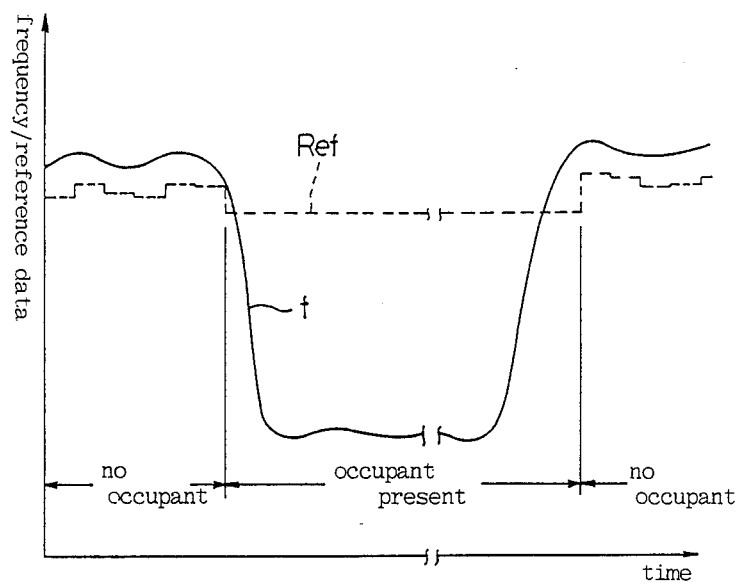
FIG. 12 graphically illustrates a timer interrupt processing operation.

The timer interrupt processing operation will be briefly described first with reference to FIG. 12. In FIG. 12, a solid-line curve indicates a change in the oscillation frequency f of the oscillator OSC of the occupant detector circuit PD1 with time while a broken line curve represents a change in reference data Ref which is established by the microprocessor MPU with time, indicating an example in each instance. In response to a timer interrupt which occurs every 0.1 second, the microprocessor samples the number of pulses delivered by the oscillator OSC, corresponding to the oscillation frequency f thereof, through the counter CTR and P/S register PSR, and stores corresponding frequency data. By utilizing the current frequency data and old frequency data which is obtained in response to the immediately preceding timer interrupt operation, the microprocessor determines and stores data representing a change in the oscillation frequency f. If the frequency change data indicates that the oscillation frequency f changes within a given range, the microprocessor determines the "absence of occupant", and updates reference data Ref with the frequency data. When the frequency change data indicates a decrease of the frequency f beyond the given range, meaning that the capacitance has rapidly increased, the detector circuit determines the "presence of an occupant" and operates to fix the reference data Ref. Thus, when the "presence of an occupant" is detected, the reference data Ref is not updated during the next and subsequent timer interrupt operations, but the fixed value of the reference data is used to compare the prevailing frequency data against it. If the frequency data exceeds the reference data Ref, indicating a decrease in the capacitance, the detector circuit determines "the absence of an occupant". Remaining occupant detector circuits PD2, PD3 and PD4 operate in a similar manner.

Figure 11:
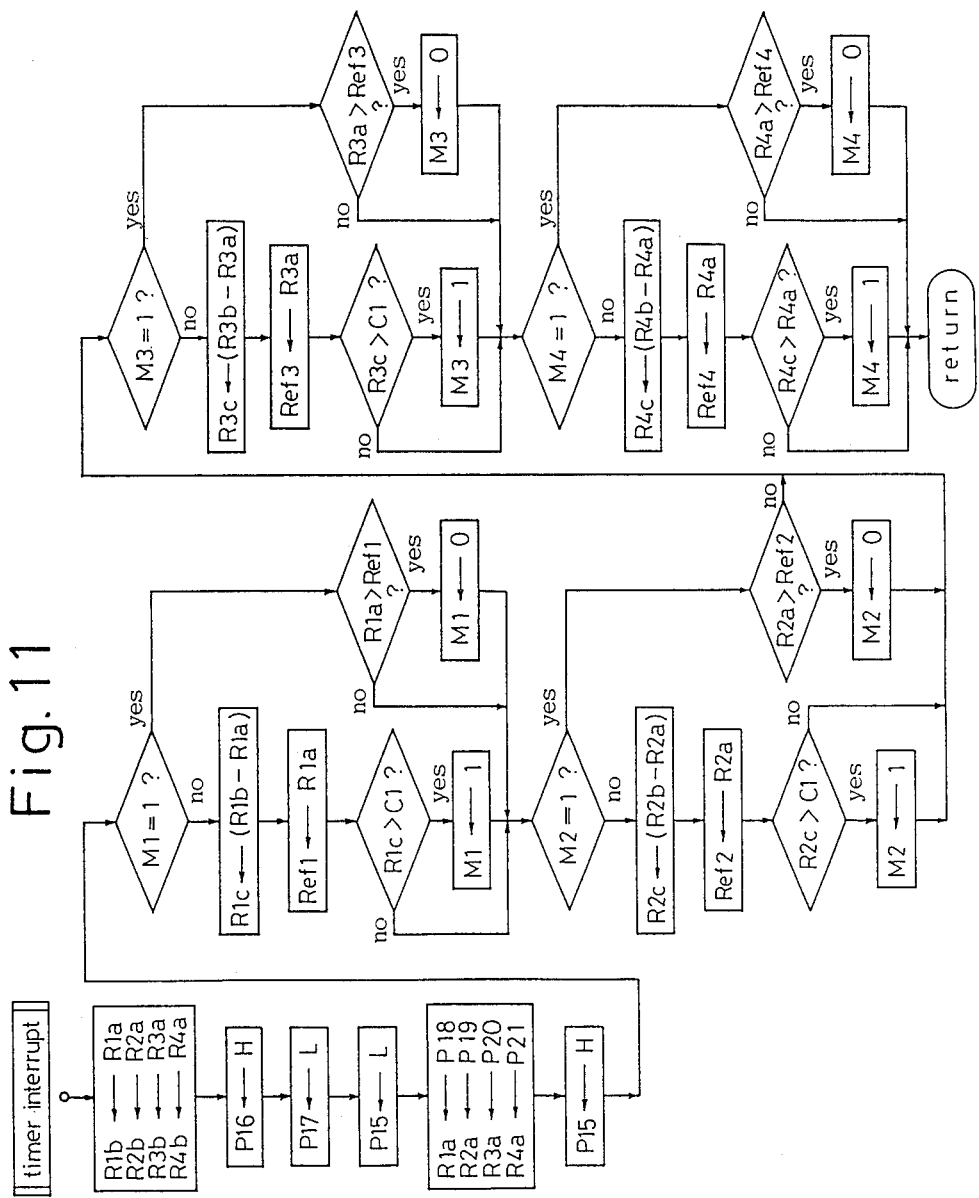
FIG. 11 is a flowchart of a timer interrupt processing operation.

Referring to FIG. 11, a timer interrupt processing operation which is initiated in response to an interrupt request from the internal timer will be more specifically described. During the timer interrupt operation, initially, a value in a register R1a is stored in a register R1b, a value in a register R2a is stored in a register R2b, a value in a register R3a is stored in a register R3b and a value in a register R4a is stored in a register R4b, respectively. Values in the registers R1a, R2a, R3a and R4a represent output frequency data from the respective detector circuits PD1, PD2, PD3 and PD4, respectively, obtained at the immediately preceding timer interrupt operation or frequency data which prevailed 0.1 second before, and thus represent old frequency data, as will be further described below. A shift load pulse of H level is then output from an output port P16, thus loading 16 bit data which is supplied from the corresponding counter CTR into PS register PSR of the respective detector circuits. Subsequently, a reset pulse of L level is output from an output port P17 to reset the respective counters CTR. In this manner, each counter CTR counts the number of pulses produced by the oscillator OSC during a time interval from the occurrence of an interrupt request from the timer to the next occurrence of interrupt request.

A clock inhibit signal from an output port P15 is changed to its L level for output. This allows PS registers PSR of the individual detector circuits to deliver the data which is loaded therein in a serial manner and in synchronism with the clock pulse. The resulting outputs or inputs to serial input ports P18, P19, P20 and P21 are read and are stored in corresponding registers R1a, R2a, R3a and R3c as new frequency data. When the storage of data into the individual registers is completed, the clock inhibit signal which is output from port P3 is changed to its H level.

A routine which is described below includes an occupant detecting routine for the front right-hand seat, and corresponding occupant detecting routines for the front left-hand, the rear right-hand and the rear left-hand seats, but the processing operation occurs in the same way, and accordingly, the occupant detecting routine for the front right-hand seat alone will be described. In this routine, when a driver MAN is seated upon the seat $ST_{FR}$, a flag M1 is set (1), and when the driver is not seated, the flag M1 is reset (0). It is assumed that the flag M1 is reset for purpose of description.

Since the current or new frequency data is stored in register R1a while old frequency data or that obtained during the immediately preceding interrupt operation is stored in register R1b, the value in the register R1a is subtracted from the value in the register R1b to provide change data, which is stored in register R1c while the value in the register R1a is stored in a register Ref1 as reference data. The value in the register R1c representing change data is compared against a threshold value C1. If the change data is equal to or less than the threshold value C1, the program then executes the occupant detecting routine for the front left-hand seat. The threshold value C1 is established as a result of an actual measurement of the oscillation frequency of the oscillator OSC. When the driver is seated upon the seat $ST_{FR}$, the capacitor formed by the detecting electrode $EL_{FR}$ and the car body has its capacitance increased rapidly, whereby the change data in the register R1c exceeds the threshold value C1, whereupon the flag M1 is set (1). When the flag M1 is set (1), the prevailing or new frequency data in register R1a is compared against the reference data in the register Ref1 which is fixed at the time the flag M1 is set, during next and subsequent interrupt processing operations. As long as the driver MAN is seated upon the seat $ST_{FR}$, the comparison does not change the flag M1 since the value in the register R1a is equal to or less than the value in the register Ref1.

When the driver MAN gets off the vehicle, the capacitance of the occupant detecting capacitor for the front right-hand seat reduces to its original value again, whereupon the oscillation frequency of the oscillator OSC in the detector circuit PD1 increases. Accordingly, during the comparison operation, the new frequency data in the register R1a exceeds the reference data in the register Ref1. Accordingly, the detector circuit determines the absence of a driver and resets the flag M1 (0). The occupant detecting routine for the front left-hand seat, the rear right-hand seat, and the rear left-hand seat takes place in the similar manner, each time setting flags M2, M3 or M4 in response to the presence of an occupant and resetting these flags in the absence of an occupant.

FIG. 10a shows steps S2, S3 and S4 which comprise an abnormality processing loop which performs a self-checking operation to find any abnormality, which is then removed by a corresponding processing operation. Status at ports P1 to P4 is examined at S5, and if any one of them assumes an L level or "0", the program proceeds to S6 where the status at ports P5 to P8 is examined. If it is found that all of the ports P6 to P8 assume an H level or "1", this signifies that the driver has forgotten to lock the door, and accordingly, a command is issued to the driver Dr6 to energize the alarm unit ALM at S7. If all the doors are locked, the program proceeds from S5 to S9 where the open/closed condition of the respective doors is examined. If all the doors are closed (fully latched), and all of the ports P5 to P8 assume their H level or "1", the program proceeds to S10. However, if any one of these ports assume L level or "0", the program returns to S2.

At step S10, the content of registers M1 to M4 which store the presence or absence of an occupant on each seat, determined as a result of the previous timer interrupt operation, is examined. If an occupant is on the vehicle, at least one of the registers M1 to M4 stores "1", whereupon the program returns to S2.

Step S11 examines if the ignition key is or is not inserted, as reflected by L level at port P0. If the ignition key is inserted and the port P0 assumes its L level or "0", the microprocessor commands the driver Dr3 to energize the solenoid So(1 for a brief time interval, thereby unlocking the front right-hand door. The program then proceeds through steps S2, S3, S5 and S6, and commands the driver Dr6 to energize the alarm unit ALM at S7. In other words, when all the doors are locked with the ignition key inserted, the door lock mechanism associated with the front right-hand or driver's seat is unlocked, indicating to this effect by the alarm unit ALM. Since this operation takes place at the moment when all the doors are locked and closed and in the absence of an occupant, a driver of the vehicle is situated near the vehicle and is able to recognize this fact.

When the engine hood and/or luggage lid is open, the port P11 and/or P12 assumes its L level or "0", whereupon the program returns to S2 from either S13 or S14.

When it is found that all the doors are locked and closed, the ignition key is not inserted, the engine hood and the luggage lid are closed, this allows a decision to be rendered that the use of the vehicle has been finished, and accordingly the microprocessor commands the window regulator system WRS to close any open window at S15. However, any window which is intentionally left open to prevent a temperature rise within the vehicle is maintained intact, as more fully disclosed in Japanese Patent Application No. 286,544/1985.

Subsequently, the microprocessor commands the motor drivers Dr4 and Dr5 to energize the motor Me of the lock mechanism associated with the engine hood as well as the motor M1 of the lock mechanism associated with the luggage lid for rotation in the reverse direction for a given time interval, thus locking the respective mechanisms.

Step S17 monitors a door unlocking by the door key KEY (ports P9 and P10), and step S18 monitors an unlatching of the luggage lid by the door key KEY (port P13). If either operation takes place, the microprocessor commands, at S19, the motor drivers Dr4 and Dr5 to energize the motors Me and M1 for rotation in the forward direction for a given time interval to unlock the engine hood and the luggage lid, whereupon the program returns to S2.

If the inside locking button is operated through a window which is left open to prevent a temperature rise within the vehicle or if a window is tampered open to operate the inside locking button, at least one of the ports P1 to P4 will assume its L level or "0" before either port P9, P10 or P13 assumes its L level or "0". When the door is open as a result of operating the inside door handle, at least one of the ports P5 to P8 will assume its L level or "0" before either port P9, P10 or P13 assumes its L level or "0". In the event an arm of an aggressor is inserted through a window, at least one of the registers M1 to M4 assumes "1" before either port P9, P10 or P13 assumes its L level or "0". If such condition or conditions are detected at S17 to S22, the program proceeds to S23 and subsequent steps, establishing a harm preventive mode.

Initially, the timer T is reset and started at S23. At S24, the microprocessor commands the relay driver Dr1 to energize the relays RL1$_1$, RL2 and RL3 to interrupt the power supply circuit to the starter motor Mst, commands the relay driver Dr2 to energize the horn Hon, the headlamp LP1 and the tail lamp LP2, and also commands the seat and steering control system SSC to control the steering unit such that the tilt angle is established to its downmost value while the telescopic length is at its maximum, and to drive the front right-hand seat ST$_{FR}$ to its foremost position while driving the seat back of this seat to its most forwardly tilted position. There is a high possibility that an aggressor will run away from the vehicle in response to such operation. Accordingly, subsequently when the timer T has a given value T1, the deenergization of the relays RL2, RL3 and RL4 is commanded at S27 to preserve the battery Btt. When the aggressor has run away and all of the registers M1 to M4 assume "0", the program proceeds through steps S29, S30 and S31, commanding the solenoid driver Dr3 to energize the door lock solenoids Sol1$_2$, Sol2, Sol3 and Sol4 for a brief time interval, thus again locking all the doors.

When the driver returns to his vehicle and unlocks the door lock mechanism using the door key KEY, port P9 or P10 assumes L level or "0". When such level is detected at S25, the program proceeds to S32 where the relay driver Dr1 is commanded to deenergize the relay RL1$_1$, the relay driver Dr2 is commanded to deenergize the relays RL2 and RL3, and the motor drivers Dr4 and Dr5 are commanded to energize the motors Me and M1 for rotation in the forward direction for a brief time interval, thereby causing the seat and steering control system SSC to return the tilt angle, the telescopic length of the steering unit and the seat position to their original values.

FIG. 10c shows a modification of the control operation by MPU. In this instance, steps S16 to S24 of the flowcharts shown in FIGS. 10a and 10b are changed. Specifically, when it is determined that the use of the vehicle has finished, a command is issued to the window regulator system WRS at S15 to close any open window, and subsequently steps S40 to S45 follow where any harm to the vehicle is detected while monitoring the ports P1 to P12 and the registers M1 to M4 in the same manner as mentioned previously.

When a harm to the vehicle is detected and a harm preventive mode is established, the timer T is reset and started at S46, and at step S47, the relay driver Dr1 is commanded to energize the relays RL1$_1$, RL2 and RL3 to interrupt the power supply circuit to the starter motor Mst, the relay driver Dr2 is commanded to energize the horn Hon, the headlamp LP1 and the tail lamp LP2, and the motor drivers Dr4 and Dr5 are commanded to energize the motors Me and M1 of the lock mechanisms associated with the engine hood and the luggage lid, respectively, for rotation in the reverse direction for a given time interval. In addition, a given command is supplied to the seat and steering control system SSC to bring the tilt angle to its downmost value, to bring the telescopic length of the steering apparatus to its maximum value, to drive the front right-hand seat ST$_{FR}$ to its foremost position and to tilt the seat back of this seat to its foremostly tilted position. In other words, the modification shown in FIG. 10c represents the control illustrated in FIGS. 10a and 10b, but the operation which took place previously at S16 is effected at S24 while removing S19.

While the lock mechanisms associated with the engine hood and the luggage lid are mechanically constructed in the embodiment described, these mechanisms may be solenoid driven, for example, and in this instance, the electrical lock may be performed by the interruption of an electrical circuit. In addition, while an occupant detecting electrode is mounted on each seat, such electrode may also be mounted on the door trim, arm rest, floor mat or the like. Sundry changes and modifications are possible.

Figure 13:
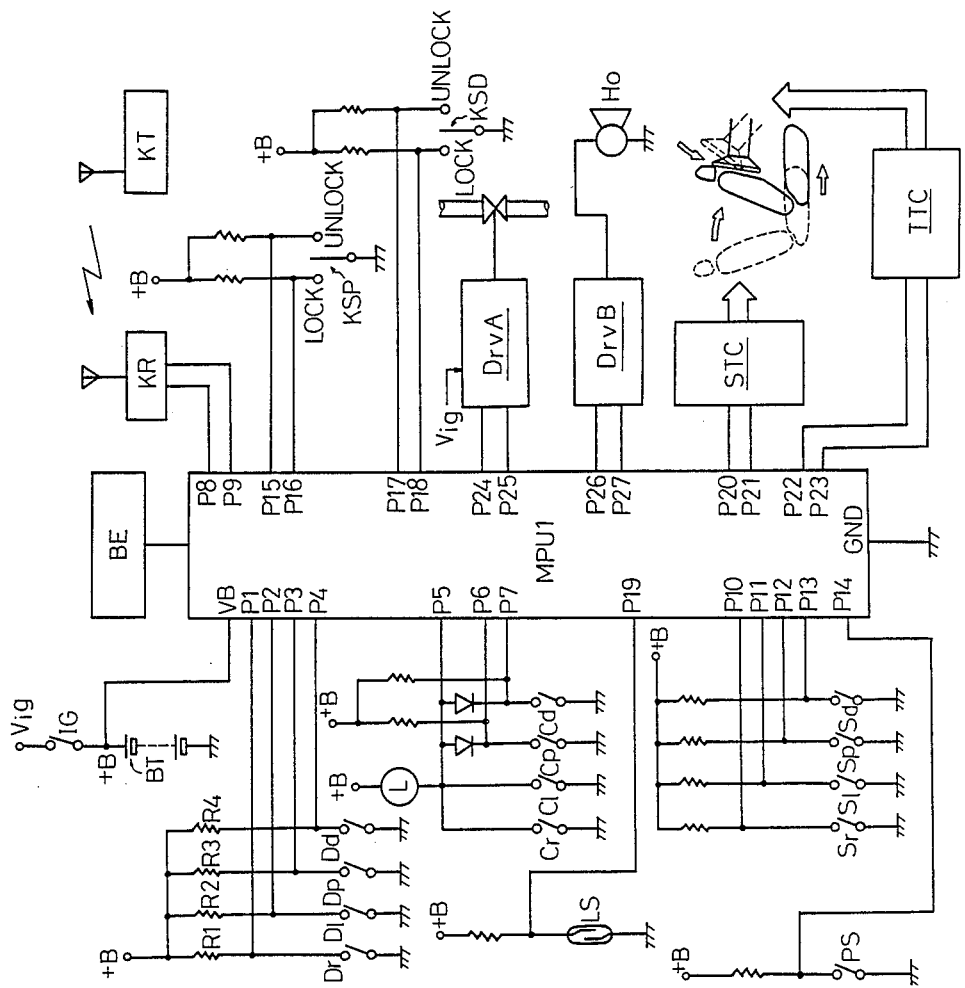
FIG. 13 is a block diagram of an electrical control system of a harm preventing apparatus for vehicle according to a second embodiment of the invention.

FIG. 13 is a block diagram of the electrical arrangement of a harm preventing apparatus according to a second embodiment of the invention. The apparatus essentially comprises a microprocessor MPU1 associated with various switches, driver circuits and keyless entry unit. The apparatus is fed from an onboard battery BT, and a backup supply BE is provided to preserve the stored content of the microprocessor MPU1 in the event the supply from the battery BT is interrupted.

MPU1 has input ports P1, P2, P3 and P4, to which are connected door lock switches Dr, Dl, Dp, Dd, respectively, which are equivalent to the door lock switches DL1, DL2, DL3 and DL4, respectively, of the first mentioned embodiment. Each of these switches is disposed in a door lock solenoid (corresponding to solenoids Sol1, Sol2, Sol3, Sol4) which drives the door lock mechanism and which also unlocks the mechanism as far as the front right-hand door is concerned. However, in the second embodiment, the door lock solenoids are included in a receiver unit KR of the keyless entry unit.

The keyless entry unit comprises a portable code transmitter KT and a vehicle mounted receiver unit KR. When a registered code and a door lock command signal are transmitted from the code transmitter KT, the receiver unit KR energizes the door lock solenoids to lock all the door lock mechanisms and also delivers an H level to input port P8 and an L level to input port P9 of MPU1. When the registered code is transmitted in combination with the door unlock command from the code transmitter KT, the code receiver energizes the door lock solenoid for the front right-hand door to unlock the lock mechanism associated with this door, and also delivers an L level to input port P8 and an H level to port P9 of MPU1. Whenever a code transmitted differs from the registered code or in the absence of a reception, the receiver delivers an L level to either port.

MPU1 also has input ports P5, P6 and P7, to which are connected door latch switches Cr, Cl, Cp and Cd which are equivalent to the door latch switches LA4, LA3, LA2 and LA1, respectively, of the first mentioned embodiment. When the rear right-hand door is open (unlatched), the switch Cr is turned on; when the rear left-hand door is open, the switch Cl is turned on; when the front left-hand door is open, the switch Ct is turned on; and when the front right-hand door is open, the switch Cd is turned on. When none of these switches is on, indicating that all the doors are closed, an H level is delivered to input port P5 of MPU1, but an L level is applied thereto whenever any switch is turned on. At this time, a room lamp L is energized. When the switch Cp is turned on or when the front left-hand door is open, an L level is supplied to input port P6 of MPU1. When the switch Cd is on, or the front right-hand door is open, an L level is supplied to input port P7 of MPU1.

MPU1 also has an interrupt input port P19, to which is connected a switch LS formed by a magnetically responsive reed switch, not shown, and a rotary magnet which is coupled to an output shaft of a transmission through a cable is disposed adjacent to the switch. Specifically, when the magnet rotates in response to the rotation of the output shaft, the reed switch LS is turned on and off in accordance with such rotation. An L level and an H level are supplied to the interrupt input port P19 of MPU1 when the reed switch LS is on and off, respectively. MPU1 executes an interrupt operation in response to the falling edge of the signal applied to the interrupt input port P19, and the vehicle speed is determined on the basis of a period with which an interrupt request occurs.

MPU1 also has input ports P10, P11, P12 and P13, to which are connected switches Sr, Sl, Sp and Sd which are seating switches embedded in the seat cushions of the rear left-hand, the rear right-hand, the front left-hand, and the front right-hand seat, respectively, and which operates the seating by detecting the weight thereon. These switches are normally off to deliver an H level to each of input ports P10 to P13. However, when an occupant is seated upon the rear left-hand seat, the switch Sr is turned on to deliver an L level to the input port P10; when an occupant is seated upon the rear right-hand seat, the switch Sl is turned on to deliver an L level to the input port P11; when an occupant is seated upon the front left-hand seat, the switch Sp is turned on to deliver an L level to the input port P12; and when an occupant is seated upon the front right-hand seat, the switch Sd is turned on to deliver an L level to the input port P10.

MPU1 also has an input port P14, to which is connected a switch PS which is equivalent to the ignition key switch IGS of the first embodiment. Specifically, when an ignition key (such as shown at KEY in FIGS. 19 and 20) is inserted into an ignition key receptacle (shown at KH in FIGS. 19 and 20), this switch is turned on to deliver an L level to input port P14.

Finally, MPU1 includes input ports P15 and P16, to which is connected a switch KSP, which is substantially equivalent to the key cylinder switch KS2 mounted on the front left-hand door as mentioned previously in connection with the first embodiment. MPU1 also has input ports P17 and P18, to which is connected a switch KSD which is substantially equivalent to the key cylinder switch KS1 mounted on the front right-hand door mentioned previously. It is to be noted that the switches KSP and KSD are formed as a two pole switch, which normally assumes a neutral position in which its movable contact does not engage either contact. However, when the door key is inserted into the key cylinder (see FIG. 4d) and is then turned to the unlock side, it delivers an L level to input port P15 or P17 of MPU1. When the key is turned to the lock side, the switch delivers an L level to input port P16 or P18 of MPU1.

A driver DrvA is connected with a fuel cut valve FCV, which is a solenoid valve connected in a "slow" passage of a carburetor and which opens the passage when energized and blocks the passage when deenergized. Thus a supply of fuel to an engine is enabled only when the fuel cut valve FCV is energized. The energization or deenergization of the driver DrvA depends on a command from output ports P24 and P25 of MPU1. When a command for energization is applied, and when a battery voltage $V_i$ is applied thereto through the ignition switch IG, the fuel cut valve FCV is energized.

A driver DrvB is connected with the horn Ho. A command from output ports P26 and P27 of MPU1 is supplied to the driver DrvB to energize or deenergize the horn. A seat control system STC includes a microcomputer which controls the attitude of the front right-hand or driver's seat in accordance with the operation of an operating switch, not shown, or in accordance with a command rom MPU1.

In the second embodiment, a seat adjust mechanism which is slightly different from that mentioned previously in connection with the first embodiment is used, and therefore will be described with reference to FIGS. 14 and 15. The seat adjust mechanism of the second embodiment comprises a seat fore-and-aft drive mechanism 100, which causes the seat $ST_{FR}$ to slide fore and aft with respect to a floor surface (such as shown at Flor in FIG. 6a), a seat front elevating mechanism 200 which elevates the front portion of a seat cushion SC, a seat rear elevating mechanism 300 which elevates the rear portion of the seat cushion SC and a seat back tilting mechanism 400 which controls the tilting of the seat back SB.

Figure 15:
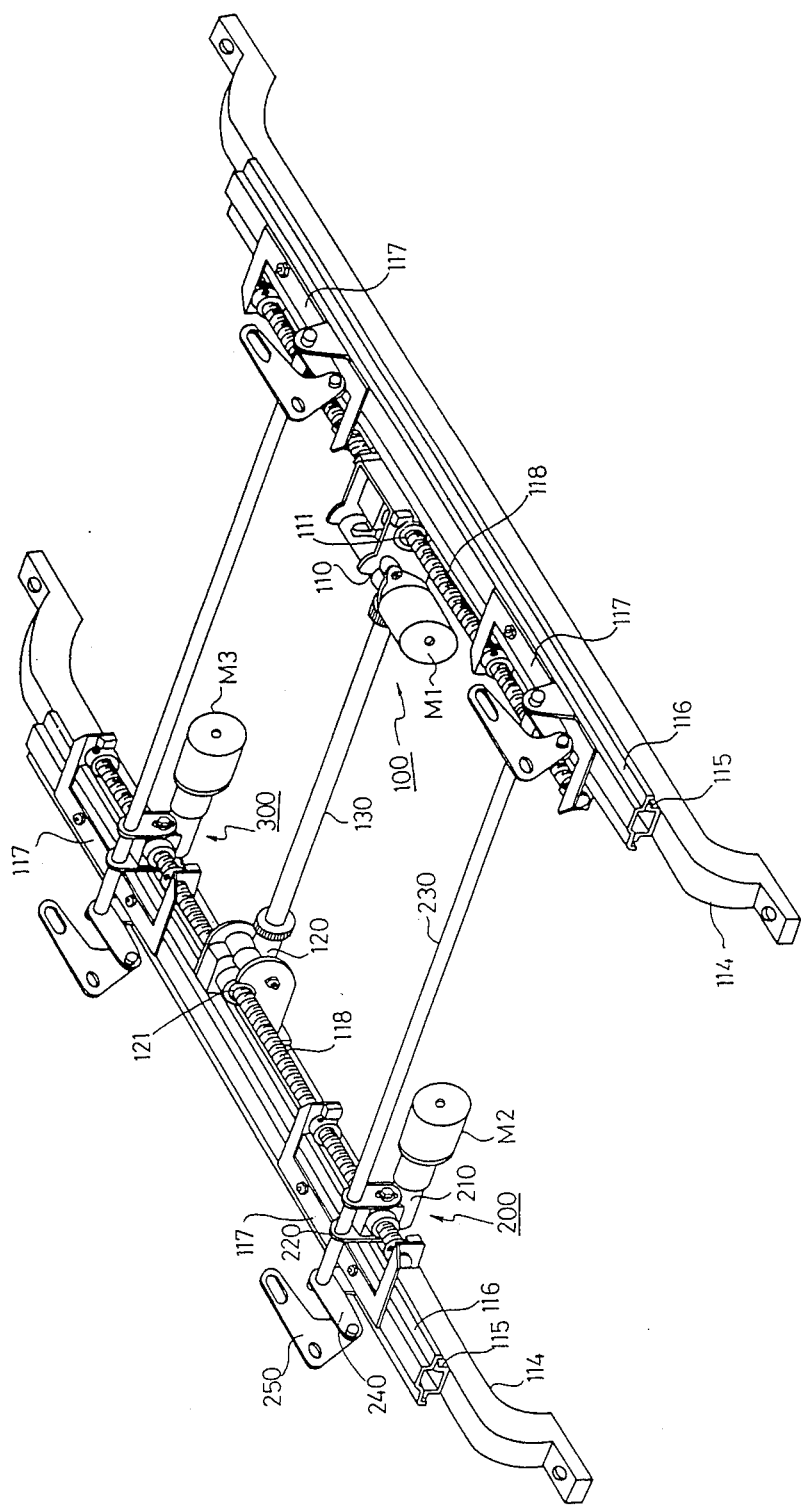
FIG. 15 is a perspective view of part thereof.

Referring to FIG. 15, the seat fore-and-aft drive mechanism 100 will be described. A pair of base frames 114 are secured to the floor, and each fixedly carries a lower rail 115. An upper rail 116 is slidably mounted on top of the lower rail 115. The upper rail 116 fixedly carries a pair of arms 117 on each side, and a threaded rod 118 is fixedly carried by the arm 117. A pair of nut units 110, 120 which are fixedly mounted on the respective base frames 114 are threadably engaged with the threaded rods 118. The nut units 110, 120 constitute the seat fore-and-aft drive mechanism 100, and each includes a nut 111 or 121 having a threaded bore formed therein for meshing engagement with the threaded rod 118 and having teeth formed around its outer periphery, and a worm gear which meshes with the respective nut 111 or 121. The worm gears are connected together by a flexible shaft 130. In the nut unit 110, a bevel gear is fixedly mounted on the shaft of the worm gear, and another bevel gear which is fixedly mounted on the shaft of the motor M1 meshes therewith. Since these nut units 110 and 120 are fixedly mounted on the respective base frames 114, as the motor M is energized for rotation, the flexible shaft 130 rotates to cause a rotation of the worm gears, which in turn cause their meshing nuts 111, 121 to rotate, whereby the threaded rods 118 are fed through the nut units 110 and 120. Since the threaded rod 118 is secured to the upper rail 116 through the arm 117, there results a movement of the upper rail 116. In this manner, when the motor M1 is energized for rotation in either forward or reverse direction, the upper rail 116 slides relative to the lower rail 115, thus moving fore and aft.

The seat front elevating mechanism 200 comprises a nut unit 210 which is constructed in the same manner as the nut unit 120, a motor M2, a rocking arm 220, a rod 230 integrally secured to the rocking arm 220, a link arm 240 integrally secured to the rod 230, and a base arm 250 which is pivotally connected with the link arm 240 and fixedly carrying a seat cushion frame (not shown). When the motor M2 is energized for rotation in either forward or reverse direction, the nut unit 210 moves fore and aft along the threaded rod 118, whereby the rod 230 and the link arm 240 rotate clockwise and counter-clockwise, respectively, to cause an elevating motion of the base arm 250.

Figure 17:
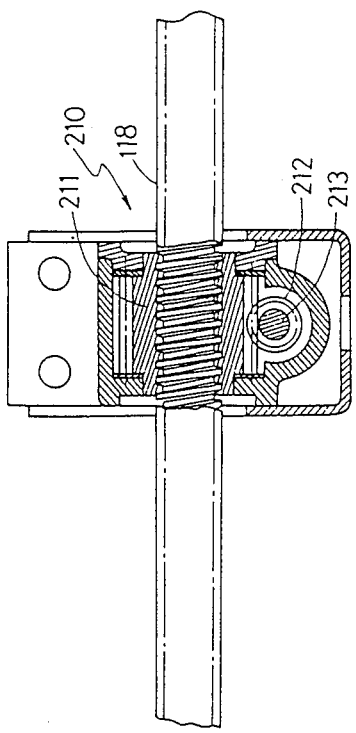
FIG. 17 is a cross section taken along the line XVII—XVII shown in FIG. 16.
Figure 16:
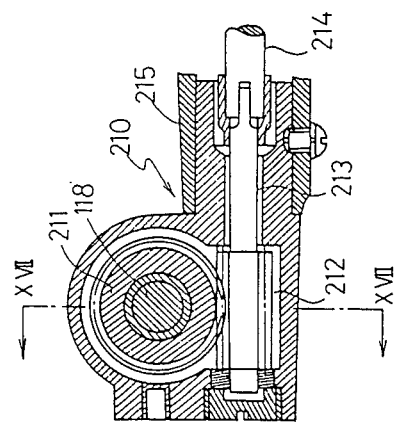
FIG. 16 is a cross section of a nut unit 210, shown in FIG. 15 and taken through a plane including a rod 230.

A fragmentary cross section, to an enlarged scale, of the nut unit 210 taken through a plane including the rod 230 is shown in FIG. 16, and FIG. 17 is a cross section taken along the line XVII—XVII. In these Figures, a nut 211 meshes with a worm 212, and a worm shaft 213 is coupled to the output shaft 214 of the motor M2 through a universal joint. Accordingly, the rotation of the motor M2 in forward or reverse direction is transmitted to the nut 211 with an increased speed reduction ratio.

The seat rear elevating mechanism 300 is constructed in substantially the same manner as the seat front elevating mechanism, and therefore will not be described.

Figure 14:
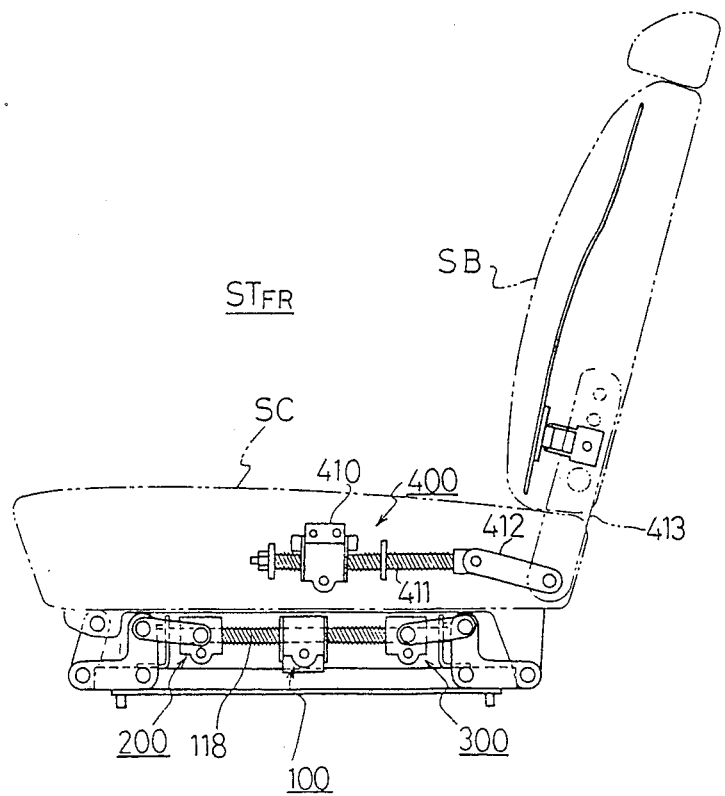
FIG. 14 is a side elevation of a seat adjusting mechanism for the driver's seat in the second embodiment.

Referring to FIG. 14, the seat back tilting mechanism 400 comprises a motor, not shown, a nut unit 410, a threaded rod 411, a link arm 412 and a functional plate 413. The mechanism 400 is constructed in essentially the same manner as the seat fore-and-aft drive mechanism 100, and a motor, not shown, and the nut unit 410 are secured to the seat cushion frame, not shown. The threaded rod 411 has its one end pivotally connected with the link arm 412, whereby its rotation is prevented. Accordingly, a rotation of the motor, not shown, in either forward or reverse direction, is converted into a reciprocating motion of the threaded rod 411. The other end of the link arm 412 is pivotally connected to the functional plate which is in turn secured to the seat back frame, not shown. Because the seat back frame is pivotally connected with the seat cushion frame, the reciprocating motion of the threaded rod 411 is effective to tilt the seat cushion SB.

Figure 18:
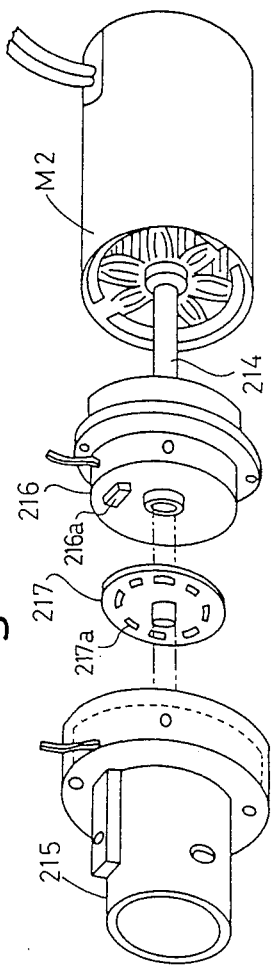
FIG. 18 is an exploded perspective view of a motor M2 shown in FIG. 15.

It is to be noted that the motor M1 in the seat fore-and-aft drive mechanism, the motor M2 in the seat front elevating mechanism, the motor M3 in the seat rear elevating mechanism and the motor, not shown, in the seat back tilting mechanism 400 are each provided with a rotary encoder comprising a Hall element and a magnet and operating to detect the detection of rotation and the number of revolutions of the respective motor. FIG. 18 illustrates an arrangement for the motor M2 by way of example. Specifically, the motor M2 has an end plate 216 (which is secured to its housing) on which a Hall element 216 is fixedly mounted so as to be spaced a given distance from and in opposing relationship with a rotary disc 217 which is fixedly mounted on a motor shaft 214. A similar Hall element is fixedly mounted on a fixed sleeve 215 and is spaced a given distance from and disposed in opposing relationship with the rotary disc 217. Eight magnets are disposed on the opposite surfaces of the rotary disc 217, whereby a square wave output is produced by the Hall elements in accordance with a rotation of the motor M2 in either forward or reverse direction.

A steering control system TTC includes a microcomputer for controlling the tilt angle and the telescopic length of a steering apparatus in response to an operation of an operating switch, not shown, or in accordance with a command from MPU1. A steering adjust mechanism which is used in the second embodiment is identical to that shown in FIGS. 8a, 8b and 8c and described above in connection with the first embodiment, and therefore will not be specifically described.

An operation of MPU1 in the second embodiment will be described below with reference to FIGS. 21 and 22 which show flowcharts. When a backup circuit is connected, MPU1 initializes internal memories, registers, flags and output ports. Subsequently, when the battery BT is connected, the microprocessor MPU1 executes a program in accordance with flowcharts shown in FIGS. 21 and 22. While not shown, an interrupt request which occurs as the reed switch LS is turned on results in the execution of an interrupt operation which calculates a vehicle speed on the basis of a period with which the switch is turned on. Vehicle speed data is stored in a register V.

Figure 22:
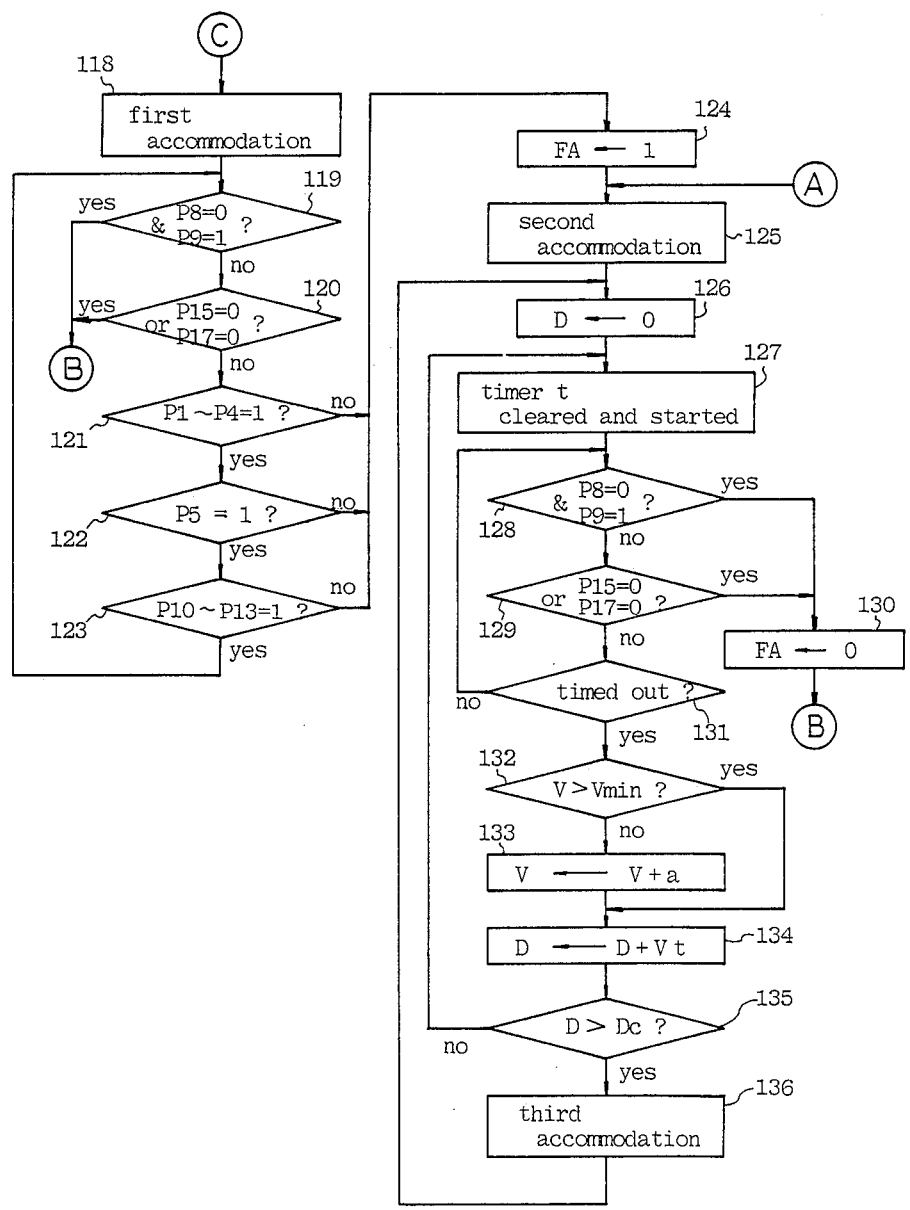

Referring to FIG. 22, when the battery BT is connected, a flag FA is examined at S101, and if the flag is reset, the program performs a recovery operation at S102, which will be described in detail later. For the moment, a control operation which begins with S103 will be described first.

When the use of a vehicle on which the apparatus of the embodiment is mounted has finished, doors can be locked generally in three ways: First, a code and a door lock signal may be transmitted from a transmitter KT of the keyless entry unit; second, the inside locking button and the outside handle may be operated jointly to lock the doors without using a key; and third, after the doors are closed, the door key may be inserted into the door lock key cylinder to lock the doors. In the present embodiment, a harm preventing function is activated when the doors are locked according to the first technique or when at least one of the front doors is locked according to the second technique.

Specifically, when the doors are locked according to the first technique, an H level or "1" is fed to the input port P8 from the receiver unit KR of the keyless entry unit while an L level or "0" is applied to the input port P9. When such inputs are detected at S103, the program proceeds to the following steps which begin with S114 for activating the harm preventing function.

When the front left-hand door is locked according to the second technique, there exists a condition for door locking during the time the front left-hand door is open, namely, the door lock switch Dp is off and an H level or "1" is applied to the input port P3, and the door latch switch Cp is on and an L level or "0" is applied to the input port P6. When such condition is detected at S104 and S106, a flag FP is set to "1" at S107. Similarly, when the front right-hand door is locked according to the second technique, there exists a condition for door locking during the time the front right-hand door is open, namely, the door lock switch Dd is off and an H level or "1" is applied to the input port P4, and the door latch switch Cd is on and an L level or "0" is applied to the input port P7. When such condition is detected at S109 and Sl14, a flag FC is set to "1" at S112. Subsequently when either the front left-hand or the front right-hand door is closed to turn the door latch switch Cp or Cd on to supply an H level or "1" to either input port P6 or P7, the program proceeds to the following steps which begin with S114 for activating the harm preventing function inasmuch as the flag FP or FC is set to "1". The flag FP is reset at S105 when the front left-hand door is unlatched, and the flag FC is reset at S110 when the front right-hand door is unlatched.

In the absence of an input from the receiver unit KR of the keyless entry unit or in response to an input which is different from that mentioned above, or when the flag FB and FC are reset to "0", the microprocessor repeatedly executes a loop comprising S103, S104, (S105), S106, S108, S109, (S110), S111 and S113 without going into the operation to be described below.

Step S114 examines if a door or doors is locked; step S115 examines an open or closed condition of a door; step S116 examines the presence or absence of an occupant; and step S117 examines if the ignition key is inserted. Accordingly, when the door is locked according to the first technique or if at least one of the front right-hand and left-hand doors is locked according to the second technique, the program proceeds to S118 shown in FIG. 22 when the ignition key is withdrawn, all of the occupant have left the vehicle and all the doors are closed and locked, thus commanding the seat control system STC and the steering control system TTC to execute a first accommodation.

When the execution of the first accommodation is commanded, the microcomputer in the seat control system operates to drive the seat $ST_{FR}$ to its foremost position, to tilt the seat back SB to its foremost position and to raise the elevation of the seat front and rear to their upper limit. During such process, outputs from rotary encoders associated with the motors of the respective drive mechanisms are monitored, and the number of revolutions until the respective drive mechanism locks mechanically and the associated motor is overloaded or ceases to rotate is obtained and stored in correspondence to the respective motor. The microcomputer of the steering control system TTC operates to increase the telescopic length to its maximum value and to drive the tilt angle of the steering apparatus to its downmost value. Again, the number of revolutions until the respective drive mechanism locks mechanically and the associated motor is overloaded or ceases to rotate is stored in correspondence to the respective motor.

Figure 20:
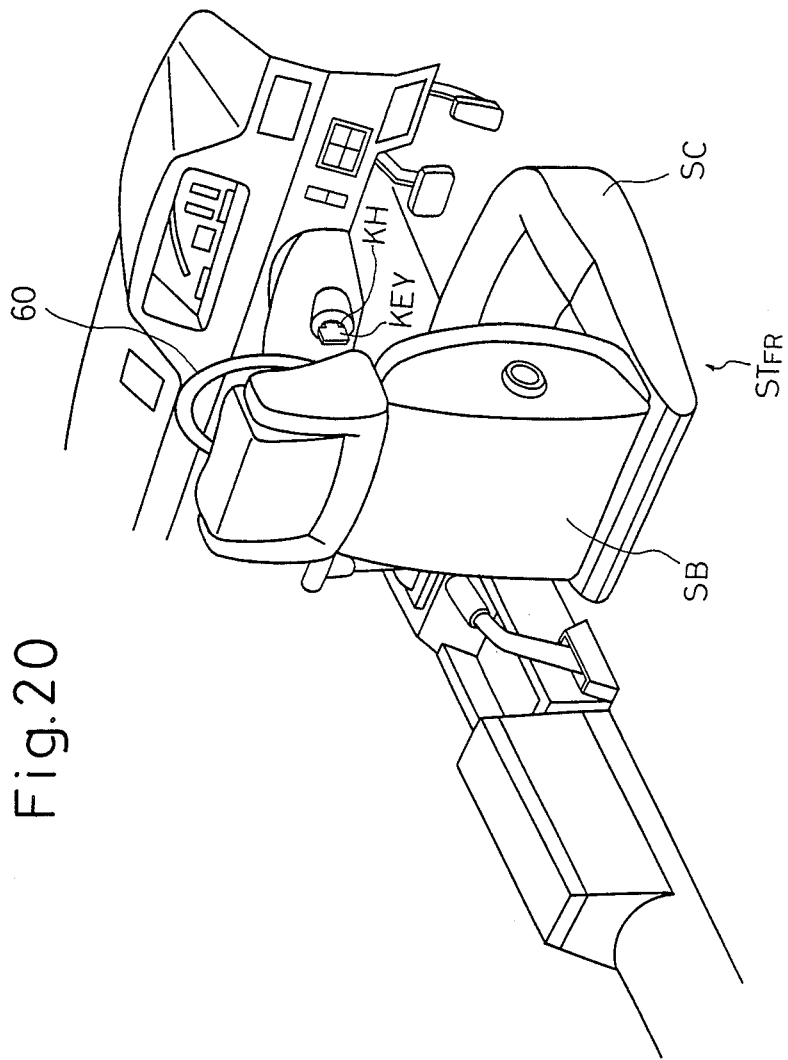
FIG. 20 is a similar perspective view illustrating the apparatus when the harm preventive mode is established.

As a result of executing the first accommodation, the spacing between the seat $ST_{FR}$ and the steering wheel 60 is substantially reduced, as illustrated in FIG. 20, disabling any driver to be seated upon the seat. As mentioned previously in connection with the various mechanisms, each of the drive mechanisms includes a reduction gearing or worm gear assembly having an increased speed reduction ratio, thus preventing the seat $ST_{FR}$ and the steering wheel 60 from being manually driven. After the execution of the first accommodation is commanded to the seat control system STC and the steering control system TTC at S118, the status of various input ports is monitored in a loop including S119, S120, S121, S122 and S123.

An owner or an entrusted user of the vehicle unlocks the doors by using the transmitter KT of the keyless entry unit or by the use of the door key. Specifically, when a registered code and an unlock signal are transmitted from the transmitter KT and received by the receiver unit KR, the latter delivers an L level or "0" to input port P8 and an H level or "1" to input port P9 of MPU1. Alternatively, when the door key is inserted into the door key cylinder associated with the front left-hand or right-hand door and is turned to its unlock side, an L level or "0" is delivered to input port P15 or P17 of MPU1. At such time, the program proceeds from S119 or S120 to S102 shown in FIG. 21, thus initiating the execution of a recovery operation.

An unauthorized aggressor having neither the transmitter KT of the keyless entry unit nor the door key may attempt an unauthorized ingress into the vehicle by tampering with the door or trying to unlock the door through a small clearance left in the side window. In such instance, before the door unlocking is detected at S119 or S120, one of the doors may be opened or unlocked and the presence of an occupant may be declared. When such condition is detected at S121, S122 or S123, flag FA is set at S124 before executing a second accommodation at S125.

In the second accommodation, the driver DrvB is commanded to energize the horn Ho for a given time interval. Subsequently, register D is cleared to zero at S126 before t timer (internal timer) is cleared and started at S127. Until the t timer overflows, the output from the receiver unit KR of the keyless entry unit and the status of the key cylinder seat KSP, KSD are monitored in a loop comprising S128, S129 and S131. In this loop, when the owner or the entrusted user of the vehicle unlocks the door by using the transmitter KT of the keyless entry unit or the door key, the program proceeds from S128 or S129 to S130 where flag FA is reset to zero before proceeding to the execution of the recovery operation shown by S102 in FIG. 21. When the t timer overflows, the prevailing vehicle speed data (indicated by "V" in the flowchart) which is stored in the register V is examined at S132, and if it is equal to or less than the minimum vehicle speed Vmin, it is multiplied by a constant a as weighting factor at S133.

At S134, a product of the time interval (indicated by "t" in the flowchart) determined by the t timer and the vehicle speed data, or a distance which the vehicle is considered to have run until the t timer overflows, is added to the content of a register D. If the value in the register D (indicated by "D" in the flowchart) is equal to or less than a value Dc representing a given distance, the program returns from S135 to S127 where the t timer is again cleared and started to repeat the described operation. However, if the value in the register D exceeds the value Dc, a third accommodation is executed at S136.

In the third accommodation, the driver DrvB is commanded to energize the horn Ho for a given time interval, and the driver DrvA is commanded to deenergize the fuel cut valve FCV. The program then returns to S126 to repeat the described operation. Thus, if an unauthorized aggressor tries to resist against the various accommodations mentioned above, the third accommodation is repeatedly executed each time a determination that the vehicle has run through a given distance Dc is rendered until the authorized unlocking takes place by the use of the transmitter KT of the keyless entry unit or the door key. If the battery BT is disconnected to cease the energization of the horn Ho, the processing operation which begins with S125 is executed when the battery BT is connected again since MPU1 retains the stored content by the provision of the backup supply BE.

Figure 21:
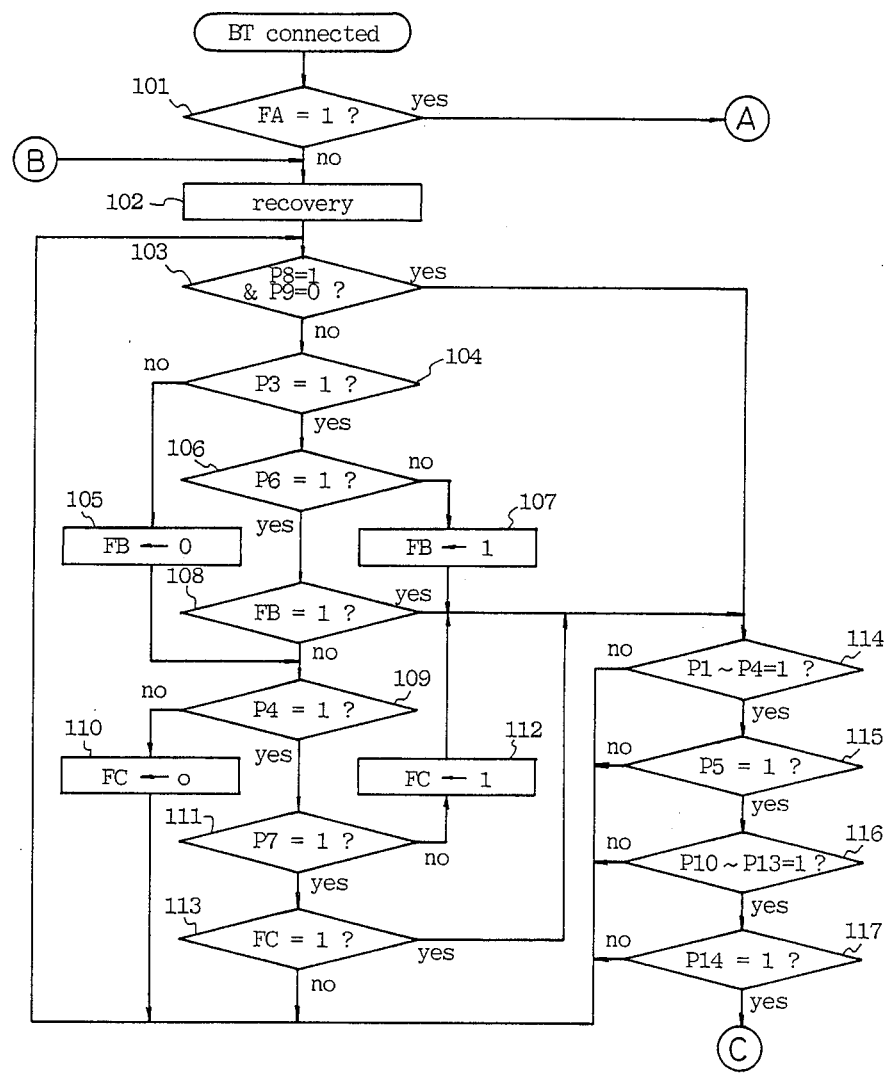
FIGS. 21 and 22 are flowcharts of a control operation by a microprocessor MPU1 shown in FIG. 13.

When the owner or the entrusted user of the vehicle unlocks the door in a normal manner, by using the transmitter KT of the keyless entry unit or the door key, the recovery operation shown at S102 in FIG. 21 is commanded. During the recovery operation, the seat control system STC and the steering control system TTC are commanded to execute the recovery operation, and the driver DrvA is commanded to energize the fuel cut valve FCV. This allows the microcomputers of the seat control system STC and the steering control system TTC to execute a control over the attitude based on the numbers of revolutions of the respective motors which have been stored at the time the first accommodation is executed in a manner corresponding to the motor of the respective drive mechanisms, thus returning the spacing between the seat $ST_{FR}$ and the steering wheel 60 to a normal spacing indicated in FIG. 19. The driver DrvA energizes the fuel cut valve FCV, and subsequently energizes the fuel cut valve FCV when the ignition switch IG is turned on.

As described, in accordance with the invention, a harm preventive mode is established during a time interval which begins with the detection of the absence of an occupant within the vehicle and the closed condition of the doors, or an out-of-use condition of the vehicle which may occur when the vehicle is parked, and which continues until an owner or an entrusted user of the vehicle unlocks the door by the use of the door key or the like. In the harm preventive mode, the spacing between the driver's seat and the steering wheel is reduced to resist against an attempted seating, either a horn or a headlamp is energized to provide an external annunciation or a fuel supply is interrupted to cease the operation of an engine. These accommodations are capable of effectively preventing harms such as a theft of a vehicle itself: or any article left inside therein or tampering with the vehicle

What is claimed is:

1. A harm preventing apparatus for vehicle comprising first detecting means for detecting the presence or absence of an occupant onboard a vehicle;

second detecting means for detecting an open/closed condition of a door of the vehicle;

an onboard door lock mechanism;

unlock means for unlocking the onboard door lock mechanism;

third detecting means for detecting the operation of the unlocking means upon the onboard door lock mechanism;

and means for establishing a harm preventive mode in response to the detection of the absence of an occupant by the first detecting means and to the detection of the closed condition of the door by the second detecting means and for terminating the harm preventive mode in response to the detection of the operation of the unlocking means by the third detecting means;

said means for establishing a harm preventive mode includes running distance detecting means for detecting the distance through which the vehicle has run, and establishes the harm preventive mode in response to the detection of a given distance run by the vehicle by the running distance detecting means after the detection of the absence of an occupant by the first detecting means and the detection of the closed condition of the door by the second detecting means and before the detection of the operation of the unlocking means by the third detecting means;

wherein said harm preventive mode comprises a theft monitoring mode which includes means for monitoring said first, second and third detecting means and a theft detecting mode which includes means for energizing alarm means when the harm preventive mode is established.

2. A harm preventing apparatus for vehicle according to claim 1 in which the second detecting means comprises means for detecting an opening or closing of the door, means for detecting a locked/unlocked condition of the onboard door lock mechanism, and signal processing means which establishes the detection of a closed condition of the door when said open/closing detecting means detects a closed condition of the door and the door lock detecting means detects the locked condition of the onboard door lock mechanism and which establishes the detection of an open condition of the door when the opening/closing detecting means detects an opening of the door or when the door lock detecting means detects an unlocked condition of the onboard door lock mechanism.

3. A harm preventing apparatus for vehicle according to claim 1 in which said means for establishing a harm preventive mode establishes the harm preventive mode in response to the detection of the open condition of the door by the second detecting means after the detection of the absence of an occupant by the first detecting means and the detection of the closed condition of the door by the second detecting means and before the detection of the operation of the unlocking means by the third detecting means.

4. A harm preventing apparatus for vehicle according to claim 1 in which said means for establishing a harm preventive mode establishes the harm preventive mode in response to the detection of the presence of an occupant by the first detecting means after the detection of the absence of an occupant by the first detecting means and the detection of the closed condition of the door by the second detecting means and before the detection of the operation of the unlocking means by the third detecting means.

5. A harm preventing apparatus for vehicle according to claim 1 in which said means for establishing a harm preventive mode includes time limit means which begins a time limiting function in response to the detection of the absence of an occupant by the first detecting means and the detection of the closed condition of the door by the second detecting means, said means for establishing a harm preventive mode establishing the harm preventive mode when the time limit means has reached a given time limit before the detection of the operation of the unlocking means by the third detection means.

6. A harm preventing apparatus for vehicle comprising
first detecting means for detecting the presence or absence of an occupant onboard a vehicle;
second detecting means for detecting an open/closed condition of a door of the vehicle;
an onboard door lock mechanism;
unlocking means for unlocking the onboard door lock mechanism;
third detecting means for detecting the operation of the unlocking means upon the onboard door lock mechanism;
means for establishing a harm preventive mode in response to the detection of the absence of an occupant by the first detecting means and the detection of a closed condition of the door by the second detecting means and for terminating the harm preventive mode in response to the detection of the operation of the unlocking means by the third detecting means;
said means for establishing a harm preventive mode includes running distance detecting means which detects a distance run by the vehicle, and establishes the harm preventive mode in response to the detection of a given distance run by the vehicle by the running distance detecting means during a time interval after the detection of the absence of an occupant by the first detecting means and the detection of a closed condition of the door by the second detecting means until the operation of the unlocking means is detected by the third detecting means;
and means for preventing maneuvering of the vehicle during the time the harm preventive mode is established including alarm means and energization control means for energizing the alarm means when the harm preventive mode is established.

7. A harm preventing apparatus for vehicle according to claim 6 in which the second detecting means comprises means for detecting an opening or closing of a door of the vehicle, means for detecting a locked/unlocked condition of the onboard door lock mechanism, and signal processing means for establishing the detection of a closed condition of the door in response to the detection of a door closing by the door opening/closing detecting means and to the detection of a locked condition of the onboard door lock mechanism by the door lock detecting means and for establishing the detection of an open condition of the door when the door opening/closing detecting means detects a door opening or when the door lock detecting means detects an unlocked condition of the onboard door lock mechanism.

8. A harm preventing apparatus for vehicle according to claim in which said means for establishing a harm preventive mode establishes the harm preventive mode in response to the detection of the open condition of the door by the second detecting means after the detection of the absence of an occupant by the first detecting means and the detection of the closed condition of the door by the second detecting means and before the detection of the operation of the unlocking means by the third detecting means.

9. A harm preventing apparatus for vehicle according to claim 6 in which said means for establishing a harm preventive mode establishes the harm preventive mode in response to the detection of the presence of an occupant by the first detecting means after the detection of the absence of an occupant by the first detecting means and the detection of the closed condition of the door by the second detecting means and before the detection of the operation of the unlocking means by the third detecting means.

10. A harm preventing apparatus for vehicle according to claim 6 in which said means for preventing a maneuvering of the vehicle comprises solenoid valve means connected in a fuel feed line which feeds a fuel to an engine, and fuel control means for controlling the solenoid valve means to interrupt the fuel fed to the engine when the harm preventive move is established.

11. A harm preventing apparatus for vehicle according to claim 6 in which the unlocking means comprises a door key.

12. A harm preventing apparatus for vehicle comprising
first detecting means for detecting the presence or absence of an occupant onboard a vehicle;
second detecting means for detecting an open/closed condition of a door of the vehicle;
an onboard door lock mechanism; unlocking means for unlocking the onboard door lock mechanism;
third detecting means for detecting the operation of the unlocking means upon the onboard door lock mechanism;
means for establishing a harm preventive mode in response to the detection of the absence of an occupant by the first detecting means and the detection of a closed condition of the door by the second detecting means and for terminating the harm preventive mode in response to the detection of the operation of the unlocking means by the third detecting means;
said means for establishing a harm preventive mode includes running distance detecting means which detects a distance run by the vehicle, and establishes the harm preventive mode in response to the detection of a given distance run by the vehicle by the running distance detecting means during a time interval after the detection of the absence of an occupant by the first detecting means and the detection of a closed condition of the door by the second detecting means until the operation of the unlocking means is detected by the third detecting means; and means for preventing maneuvering of the vehicle during the time the harm preventive mode is established, wherein said means for establishing a harm preventive mode includes time limit means which begins its time limiting occupant by the first detecting means and the detection of a closed condition of the door by the second detecting means, and establishes the harm preventive mode when the time limit means reaches a given time interval before the time interval before the operation of the unlocking means is detected by the third detecting means.

13. A harm preventing apparatus for vehicle comprising first detecting means for detecting the presence or absence of an occupant onboard a vehicle;

second detecting means for detecting an open/closed condition of a door of the vehicle;

an onboard door lock mechanism;

unlocking means for unlocking the onboard door lock mechanism;

third detecting means for detecting the operation of the unlocking means upon the onboard door lock mechanism;

means for establishing a harm preventive mode in response to the detection of the absence of an occupant by the first detecting means and the detection of a closed condition of the door by the second detecting means and for terminating the harm preventive mode in response to the detection of the operation of the unlocking means by the third detecting means;

and means for preventing maneuvering of the vehicle during the time the harm preventive mode is established including alarm means and energization control means for energizing the alarm means when the harm preventive mode is established wherein said means for preventing a maneuvering of the vehicle includes a driver's seat which is supported in a manner to change its attitude of the driver's seat, and attitude control means for controlling the seat drive mechanism to reduce the spacing between the driver's seat and a steering wheel when the harm preventive mode is established.

14. A harm preventing apparatus for vehicle according to claim 13 in which the attitude control means includes seat attitude detecting means for detecting the attitude of the driver's seat, and memory means for storing information representing the attitude of the driver's seat which prevails before the harm preventive mode is established, the attitude control means being operative, upon termination of the harm preventive mode by said means for establishing a harm preventive mode, to control the seat drive mechanism while monitoring detected information from the seat attitude detecting means to restore the driver's seat to the attitude which is based on the stored information in the memory means.

15. A harm preventing apparatus for vehicle according to claim 13 in which the seat drive mechanism comprises a seat fore-and-aft drive mechanism which drives the driver's seat before and after.

16. A harm preventing apparatus for vehicle according to claim 13 wherein the driver's seat includes a seat back and the seat drive mechanism comprises a seat back tilting mechanism for angularly driving said seat back.

17. A harm preventing apparatus for vehicle comprising first detecting means for detecting the presence or absence of an occupant onboard a vehicle;

second detecting means for detecting an open/closed condition of a door of the vehicle;

an onboard door lock mechanism;

unlocking means for unlocking the onboard door lock mechanism;

third detecting means for detecting the operation of the unlocking means upon the onboard door lock mechanism;

means for establishing a harm preventive mode in response to the detection of the absence of an occupant by the first detecting means and the detection of a closed condition of the door by the second detecting means and for terminating the harm preventive mode in response to the detection of the operation of the unlocking means by the third detecting means;

and means for preventing maneuvering of the vehicle during the time the harm preventive mode is established including alarm means and energization control means for energizing the alarm means when the harm preventive mode is established wherein said means for preventing a maneuvering of the vehicle comprises a steering wheel which is supported in a manner to change its attitude, a steering wheel drive mechanism for changing the attitude of the steering wheel, and attitude control means for controlling the steering drive mechanism to reduce the spacing between the driver's seat and the steering wheel when the harm preventive mode is established.

18. A harm preventing apparatus for vehicle according to claim 17 in which the attitude control means comprises steering wheel attitude detecting means for detecting information representing the attitude of the steering wheel, and memory means for storing information representing the attitude of the steering wheel which prevails before the harm preventing mode is established, the attitude control means being operative, upon termination of the harm preventive mode by said means for establishing a harm preventive mode, to control the steering wheel drive mechanism while monitoring detected information from the steering wheel attitude detecting means to restore the steering wheel to the attitude which is based upon the stored information in the memory means.

19. A harm preventing apparatus for vehicle according to claim 17 in which the steering wheel drive mechanism comprises a steering wheel telescoping mechanism which drives the steering wheel fore and aft in its axial direction.

20. A harm preventing apparatus for vehicle according to claim 17 in which the steering wheel drive mechanism comprises a steering wheel tilting mechanism which drives the steering wheel angularly in a vertical plane.

21. A harm preventing apparatus for vehicle comprising
first detecting means for detecting the presence or absence of an occupant onboard a vehicle;
second detecting means for detecting an open/closed condtion of a door of the vehicle;
an onboard door lock mechanism;
unlocking means for unlocking the onboard door lock mechanism;
third detecting means for detecting the operation of the unlocking means upon the onboard door lock mechanism;
means for establishing a harm preventing mode in response to the detection of the absence of an occupant by the first detecting means and the detection of a closed condition of the door by the second detecting means and for terminating the harm preventive mode in response to the detection of the operation of the unlocking means by the third detecting means;
and means for preventing maneuvering of the vehicle during the time the harm preventive mode is established including alarm means and energization control means for energizing the alarm means when the harm preventive mode is established
wherein said means for preventing a maneuvering of the vehicle comprises a driver's seat which is supported in a manner to change its attitude, a seat driver mechanism for changing the attitude of the driver's seat, a steering wheel which is supported in a manner to change its attitude, a steering wheel which is supported in as manner to change its attitude, a steering wheel drive mechanism for changing the attitude of the steering wheel, and attitude control means for controlling the seat drive mechanism and the steering wheel drive mechanism to reduce the spacing between the driver's seat and the steering wheel when the harm preventive mode is established.

22. A harm preventing apparatus for vehicle according to claim 21 in which the attitude control means comprises seat attitude detecting means for detecting information representing the attitude of the driver's seat, steering wheel attitude detecting means for detecting information representing the attitude of the steering wheel, and memory means for storing information representing the attitude of the driver's seat and information representing the attitude of the steering wheel, both of which prevail before the harm preventive mode is established, the attitude control means being operative, upon termination of the harm preventive mode by said means for establishing a harm preventive mode, to control the seat drive mechanism while monitoring detected information from the seat attitude detecting means to restore the driver's seat to the attitude which is based upon the stored information in the memory means and to control the steering wheel drive mechanism while monitoring detected information from the steering wheel attitude detecting means to restore the steering wheel to the attitude which is based upon the stored information in the memory means.

23. A harm preventing apparatus for vehicle comprising
first detecting means for detecting the presence or absence of an occupant onboard vehicle;
second detecting means for detecting an open/closed condition of a door of the vehicle;
an onboard door lock mechanism;
unlocking means for unlocking the onboard door lock mechanism;
third detecting the operation of the unlocking means upon the onboard door lock mechanism;
an electric drive mechanism for changing the attitude of at least one of a driver's seat and a steering wheel;
and a controller for controlling the electric drive mechanism to reduce a first spacing between the driver's seat and the steering wheel to a second spacing in response to the detection of the absence of an occupant by the first detecting means and the detection of a closed condition of the door by the second detecting means, and for controlling the electric drive mechanism to increase the distance between the driver's seat and the steering wheel from said second spacing to said first spacing when the operation of the unlocking means is detected by the third detecting means.

24. A harm preventing apparatus for vehicle according to claim 23 in which the electric drive mechanism comprises a seat fore-and-aft drive mechanism which changes the attitude of the driver's seat as viewed in a fore-and-aft direction.

25. A harm preventing apparatus for vehicle according to claim 23 in which the electric drive mechanism comprises to a seat back tilting mechanism which changes a tilting of the seat back of the driver's seat as viewed in the fore-and-aft direction.

26. A harm preventing apparatus for vehicle according to claim 23 in which the electric drive mechanism comprises a steering wheel telescoping mechanism which changes the axial attitude of the steering wheel.

27. A harm preventing apparatus for vehicle according to claim 23 in which the electric drive mechanism comprises a steering wheel tilting mechanism which changes an angle of the steering wheel as viewed in a vertical plane.

28. A harm preventing apparatus for vehicle according to claim 23 in which the electric drive mechanism comprises a seat fore-and-aft drive mechanism which changes the attitude of the driver's seat as viewed in a fore-and-aft direction, a seat back tilting mechanism which changes a tilting of the seat back of the driver's seat as viewed in the fore-and-aft direction, a steering wheel telescoping mechanism which changes an axial attitude of the steering wheel, and a steering wheel tilting mechanism which changes an angle of the steering wheel as viewed in a vertical plane.

29. A harm preventing apparatus for vehicle according to claim 23 in which the unlocking means comprises a door key.

30. A harm preventing apparatus for vehicle comprising
first detecting means for detecting the presence or absence of an occupant onboard a vehicle;
second detecting means for detecting an open/closed condition of a door of the vehicle;
an onboard door lock mechanism;
unlocking means for unlocking the onboard door lock mechanism;
third detecting means for detecting the operation of the unlocking means upon the onboard door lock mechanism;
a vehicle harm preventing mechanism including at least engine stop means;
means for detecting a distance run by the vehicle;

and a controller for controlling the vehicle harm preventing mechanism to stop the engine in response to the detection of a given distance run by the vehicle by the running distance detecting means after the detection of the absence of an occupant by the first detecting means and the detection of a closed condition of the door by the second detecting means and before the detection of the operation of the unlocking means by the third detecting means.

31. A harm preventing apparatus for vehicle according to claim 30 in which said means for stopping the engine of the vehicle harm preventing mechanism comprises solenoid valve means connected in a fuel feed line which feeds a fuel to the engine, thereby interrupting the feeding of a fuel.

32. A harm preventing apparatus for vehicle according to claim 30 in which the vehicle harm preventing mechanism additionally includes annunciator means, the controller energizing the annunciator means in response to the detection of a given distance run by the vehicle by the running distance detecting means after the detection of the absence of an occupant by the first detecting means and the detection of a closed condition of the door by the second detecting means and before the detection of the operation of the unlocking means by the third detecting means.

33. A harm preventing apparatus for vehicle according to claim 30 in which the unlocking means comprises a door key.

34. A harm preventing apparatus for vehicle comprising
first detecting the presence or absence of an occupant onboard a vehicle;
an onboard opening covering member which can be opened and closed;
a first electric drive mechanism for driving the onboard opening covering member to open or close it;
second detecting means for detecting an open/closed condition of a door of the vehicle;
an onboard door lock mechanism;
unlocking means for unlocking the onboard door lock mechanism;
third detecting means for detecting the operation of the unlocking means upon the onboard door lock mechanism;
a vehicle harm preventing mechanism including a second electric mechanism which drives at least one of a driver's seat and a steering wheel of the vehicle;
and control means for controlling the first electric drive mechanism and the vehicle harm preventing mechanism, the control means operating to establish the onboard opening covering member at a preselected position in response to the detection of the absence of an occupant by the first detecting means and the detection of a closed condition of the door by the second detecting means, and operating to reduce the spacing between the driver's seat and the steering wheel from a first spacing to a second spacing in response to the detection of the presence of an occupant by the first detecting means or in response to the detection of an open condition of the door of the vehicle by the second detecting means, both before the operation of the unlocking means is detected by the third detecting means.

35. A harm preventing apparatus for vehicle according to claim 34 in which the control means restores the spacing between the driver's seat and the steering wheel to said first spacing in response to the detection of the operation of the unlocking means by the third detecting means after the spacing between the driver's seat and the steering wheel has once been reduced.

36. A harm preventing apparatus for vehicle according to claim 34 in which the second detecting means comprises means for detecting an opening or closing of the door, and door lock detecting means for detecting a locked/unlocked condition of the onboard door lock mechanism.

37. A harm preventing apparatus for vehicle according to claim 36 in which the control means establishes the onboard opening covering member at a preselected position in response to the detection of the absence of an occupant by the first detecting means, the detection of a door opening by the door opening/closing detecting means and the detection of a locked condition of the onboard door lock mechanism by the door lock detecting means, and reduces the spacing between the driver's seat and the steering wheel in response to the detection of the presence of an occupant by the first detecting means and the detection of a door opening by the door opening/closing detecting means or in response to the detection of an unlocked condition of the onboard door lock mechanism by the door lock detecting means, before the operation of the unlocking means is detected by the third detecting means.

38. A harm preventing apparatus for vehicle according to claim 32 in which the onboard door lock mechanism includes a third electric drive mechanism which locks at least the lock mechanism, the control means controlling the third electric drive mechanism to lock the onboard door lock mechanism in response to the detection of absence of an occupant by the first detecting means and the detection of a door closing by the door opening/closing detecting means after the spacing between the driver's seat and the steering wheel has once been reduced.

39. A harm preventing apparatus for vehicle according to claim 36 in which the vehicle harm preventing mechanism includes alarm means, the control means energizing the alarm means in response to the detection of the unlocked condition of the onboard door lock mechanism by the door lock detecting means when the door opening/closing detecting means detects a door closing.

40. A harm preventing apparatus for vehicle according to claim 44 in which the first detecting means includes an electrical ground formed by a car body of the vehicle, an onboard electrode disposed in opposing relationship with the electrical ground with at least part of a person located on an onboard seat interposed therebetween, and means for detecting a capacitance between the electrical ground and the onboard electrode.

41. A harm preventing apparatus for vehicle according to claim 40 in which the control means monitors the capacitance detected by said means for detecting a capacitance to determine the presence of an occupant in response to an increase in the capacitance and to determine the absence of an occupant in response to a decrease in the capacitance.

42. A harm preventing apparatus for vehicle according to claim 34 in which the first detecting means includes an electrical ground formed by a car body of the vehicle, an onboard electrode disposed in opposing relationship with the electrical ground with at least part of a person located on an onboard seat interposed therebetween, means for detecting a capacitance formed between the electrical ground and the onboard electrode, and means for detecting the presence or absence of an ignition key which is inserted into an onboard ignition key receptacle.

43. A harm preventing apparatus for vehicle according to claim 42 in which the control means monitors a capacitance detected by said means for detecting a capacitance and a detection output from the ignition key detecting means, determines the presence of an occupant in response to an increase in the capacitance or in response to the detection of the insertion of the ignition key by said ignition key detecting means, and determines the absence of an occupant in response to a decrease in the capacitance and the detection of the absence of the ignition key inserted by said ignition key detecting means.

44. A harm preventing apparatus for vehicle according to claim 34 in which the unlocking means comprises a door key.

45. A harm preventing apparatus for vehicle comprising
first detecting means for detecting the presence or absence of an occupant onboard a vehicle;
a first onboard opening covering member which can be opened and closed;
an electric drive mechanism for driving the first onboard opening covering member to open or close it;
second detecting means for detecting an open/closed condition of a door of the vehicle;
an onboard door lock mechanism;
unlocking mean for unlocking the onboard door lock mechanism;
third detecting means for detecting the operation of the unlocking means upon the onboard door lock mechanism;
a second onboard opening covering member which can be opened and closed;
a vehicle harm preventing mechanism including at least an electric lock mechanism for the second onboard opening covering member;
and control means for controlling at least the electric drive mechanism and the onboard harm preventing mechanism, the control means establishing the first onboard opening covering member at a preselected position in response to detection of the absence of an occupant by the first detecting means and the detection of a closed condition of the door by the second detecting means and establishing the second onboard opening covering member in its locked condition in response to the detection of the presence of an occupant by the first detecting means or in response to the detection of an open condition of the vehicle by the second detecting means, both before the operation of the unlocking means is detected by the third detecting means.

46. A harm preventing apparatus for vehicle according to claim 45 in which the control means establishes the second onboard opening covering member in its unlocked condition in response to the detection of the operation of the unlocking means by the third detecting means after the second onboard opening covering member has once been established in its locked condition.

47. A harm preventing apparatus for vehicle according to claim 45 in which the second detecting means comprises means for detecting an opening or closing of a door, and door lock detecting means for detecting a locked/unlocked condition of the onboard door lock mechanism.

48. A harm preventing apparatus for vehicle according to claim 47 in which the control means establishes the onboard opening covering member in a preselected position in response to the detection of the absence of an occupant by the first detecting means, the detection of a door closing by the door opening/closing detecting means and the detection of a locked condition of the onboard door lock mechanism by the door lock detecting means, and subsequently establishes the second onboard opening covering member in its locked condition in response to the detection of the presence of an occupant by the first detecting means and the detection of a door opening by the door opening/closing detecting means or in response to the detection of an unlocked condition of the onboard door lock mechanism by the door lock detecting means, both before the operation of the door locking means is detected by the third detecting means.

49. A harm preventing apparatus for vehicle according to claim 48 in which the onboard door lock mechanism includes a door lock electric drive mechanism which locks at least the lock mechanism, the control means controlling the door lock electric drive mechanism to lock the onboard door lock mechanism in response to the detection of the absence of an occupant by the first detecting means and the detection of a door closing by the door opening/closing detecting means after the second onboard opening covering member has once been locked.

50. A harm preventing apparatus for vehicle according to claim 47 in which the vehicle harm preventing mechanism includes alarm means, the control means energizing the alarm means in response to the detection of an unlocked condition of the onboard door lock mechanism by the door lock detecting means when a door closing is detected by the door opening/closing detecting means.

51. A harm preventing apparatus for vehicle according to claim 45 in which the first detecting means comprises an electrical ground formed by a car body of the vehicle, an onboard electrode disposed in opposing relationship with the electrical ground with at least part of a personnel located on an onboard seat interposed therebetween, and means for detecting a capacitance formed between the electrical ground and the onboard electrode.

52. A harm preventing apparatus for vehicle according to claim 45 in which the first detecting means comprises an electrical ground formed by a car body of the vehicle, an onboard electrode disposed in opposing relationship with the electrical ground with at least part of a person located on an onboard seat interposed therebetween, means for detecting a capacitance formed between the electrical 53. A harm preventing apparatus for vehicle according to claim 45 in which the first detecting means comprises an electrical ground formed by a car body of the vehicle, an onboard electrode disposed in opposing relationship with the electrical ground with at least part of a person located on an onboard seat interposed therebetween, means for detecting a capacitance formed between the electrical ground and the onboard electrode, and means for detecting the presence of an ignition key inserted into an onboard ignition key receptacle.

54. A harm preventing apparatus for vehicle according to claim 53 in which the control means monitors a capacitance detected by said means for detecting a capacitance and a detection output from said ignition detecting means, determines the presence of an occupant in response to an increase in the capacitance or in response to the detection of the presence of the ignition key by the ignition key detecting means, and determines the absence of an occupant to the detection of the absence of the ignition key by said ignition key detecting means.

55. A harm preventing apparatus for vehicle according to claim 45 in which the first detecting means comprises an electrical ground formed by a car body of the vehicle, an onboard electrode disposed in opposing relationship with the electrical ground with at least part of a person located on an onboard seat interposed therebetween, means for detecting a capacitance formed between the electrical ground and the onboard electrode, means for detecting the presence of the ignition key which is inserted into an onboard ignition key receptacle, and means for detecting an opening or closing of the second onboard opening covering member.

56. A harm preventing apparatus for vehicle according to claim 55 in which the control means monitors a capacitance detected by said means for detecting a capacitance, a detection output from the ignition key detecting means and an output from said means for detecting an opening or closing of the second onboard opening covering member, determines the presence of an occupant in response to an increase in the capacitance and the detection of the ignition key by said ignition key detecting means, or in response to the detection of an opening of the second onboard opening covering member by said means for detecting the opening or closing of the second onboard opening covering member, and determines the absence of an occupant in response to a decrease in the capacitance, the detection of the absence of the ignition key by said ignition key detecting means and the detection of a closing of the second onboard opening covering member by said means.

57. A harm preventing apparatus for vehicle according to claim 45 in which the second onboard opening covering member comprises a luggage lid and an engine hood, and the unlocking means comprises a door key.

58. A harm preventing apparatus for vehicle comprising first detecting means for detecting the presence or absence of an occupant onboard a vehicle;
a first onboard opening covering member which can be opened and closed;
a first electric drive mechanism for driving the first onboard opening covering member to open or close it;
second detecting means for detecting an open/closed condition of a door of the vehicle;
an onboard door lock mechanism;
unlocking means for unlocking the onboard door lock mechanism;
third detecting means for detecting the operation of the unlocking means upon the onboard door lock mechanism;
a second onboard opening covering member which can be opened and closed;
a vehicle harm preventing mechanism including a second electric drive mechanism for driving at least one of an onboard driver's seat and a steering wheel and an electric lock mechanism for the second onboard opening covering member;
and control means for controlling at least the electric drive mechanism and the vehicle harm preventing mechanism, the control means establishing the first onboard opening covering member at its standby position in response to detection of the absence of an occupant by the first detecting means and the detection of a closed condition of the door by the second detecting means and reducing the spacing between the onboard driver's seat and the steering wheel and establishing the second onboard opening covering member in its locked condition in response to the detection of the presence of an occupant by the first detecting means or in response to the detection of an open condition of the vehicle by the second detecting means, both before the operation of the unlocking means is detected by the third detecting means.

59. A harm preventing apparatus for vehicle according to claim 58 in which the control means restores the spacing between the driver's seat and the steering wheel and establishes the second onboard opening covering member in its unlocked condition in response to the detection of the operation of the unlocking means by the third detecting means after the spacing has once been reduced and the second onboard opening covering member has once been established in its locked condition.

60. A harm preventing apparatus for vehicle according to claim 58 in which the second detecting means comprises means for detecting an opening or closing of a door, and door lock detecting means for detecting a locked/unlocked condition of the onboard door lock mechanism.

61. A harm preventing apparatus for vehicle according to claim 60 in which the control means establishes the onboard opening covering member in its standby position in response to the detection of the absence of an occupant by the first detecting means, the detection of a door closing by the door opening/closing detecting means and the detection of a locked condition of the onboard door lock mechanism by the door lock detecting means, and subsequently reduces the spacing between the driver's seat and the steering wheel and establishes the second onboard opening covering member in its locked condition in response to the detection of the presence of an occupant by the first detecting means and the detection of a door opening by the door opening/closing detecting means or in response to the detection of an unlocked condition of the onboard door lock mechanism by the door lock detecting means, both before the operation of the door locking means is detected by the third detecting means.

62. A harm preventing apparatus for vehicle according to claim 61 in which the onboard door lock mechanism includes a third electric drive mechanism which locks at least the lock mechanism, the control means controlling the third electric drive mechanism to lock the onboard door lock mechanism in response to the detection of the absence of an occupant by the first detecting means and the detection of a door closing by the door opening/closing detecting means after the spacing between the driver's seat and the steering wheel has once been reduced and the second onboard opening covering member has once been locked.

63. A harm preventing apparatus for vehicle according to claim 60 in which the vehicle harm preventing mechanism includes alarm means, the control means energizing the alarm means in response to the detection of an unlocked condition of the onboard door lock mechanism by the door lock detecting means when a door closing is detected by the door opening/closing detecting means.

64. A harm preventing apparatus for vehicle according to claim 58 in which the first detecting means comprises an electrical ground formed by a car body of the vehicle, an onboard electrode disposed in opposing relationship with the electrical ground with at least part of a person located on an onboard seat interposed therebetween, and means for detecting a capacitance formed between the electrical ground and the onboard electrode response to a decrease in the capacitance.

65. A harm preventing apparatus for vehicle according to claim 64 in which the control means monitors a capacitance detected by said means for detecting a capacitance and indicates the presence of an occupant in response to an increase in the capacitance and indicates the absence of an occupant in response to a decrease in the capacitance.

66. A harm preventing apparatus for vehicle according to claim 58 in which the first detecting means comprises an electrical ground formed by a car body of the vehicle, an onboard electrode disposed in opposing relationship with the electrical ground with at least part of a person located on an onboard seat interposed therebetween, means for detecting a capacitance formed between the electrical located on an onboard seat interposed therebetween, means for detecting a capacitance formed between the electrical ground and the onboard electrode, and means for detecting the presence of an ignition key inserted into an onboard ignition key receptacle.

67. A harm preventing apparatus for vehicle according to claim 66 in which the control means monitors a capacitance detected by said means, and a detection output from said ignition key detecting means for detecting a capacitance and a detection output from said ignition key detecting means, determines the presence of an occupant in response to an increase in the capacitance or in response to the detection of the presence of the ignition key by the ignition key detecting means, and determines the absence of an occupant in response to a decrease in the capacitance and to the detection of the absence of the ignition key by said ignition key detecting means.

68. A harm preventing apparatus for vehicle according to claim 58 in which the first detecting means comprises an electrical ground formed by a car body of the vehicle, an onboard electrode disposed in opposing relationship with the electrical ground with at least part of a person located on an onboard seat interposed therebetween, means for detecting a capacitance formed between the electrical ground and the onboard electrode, means for detecting the presence of the ignition key which is inserted into an onboard ignition key receptacle, and means for detecting an opening or closing of the second onboard opening covering member.

69. A harm preventing apparatus for vehicle according to claim 68 in which the control means monitors a capacitance detected by said means for detecting a capacitance, a detection output from the ignition key detecting means and an output from said means for detecting an opening or closing of the second onboard opening covering member, determines the presence of an occupant in response to an increase in the capacitance and the detection of the ignition key by said ignition key detecting means, or in response to the detection of an opening of the second onboard opening covering member by said means for detecting an opening or closing of the second onboard opening covering member and determines the absence of an occupant in response to a decrease in the capacitance, the detection of the absence of the ignition key by said ignition key detecting means and the detection of a closing of the second onboard opening covering member by said means.

70. A harm preventing apparatus for vehicle according to claim 58 in which the second onboard opening covering member comprises a luggage lid and an engine hood, and the unlocking means comprises a door key.

* * * * *